US012748434B2

(12) United States Patent
Greiff et al.

(10) Patent No.: US 12,748,434 B2
(45) Date of Patent: Sep. 29, 2026

(54) MOTION PLANNING AND CONTROL WITH MULTI-STAGE CONSTRUCTION OF INVARIANT SETS

(71) Applicant: Mitsubishi Electric Research Laboratories, Inc., Cambridge, MA (US)

(72) Inventors: Marcus Greiff, Cambridge, MA (US); Stefano Di Cairano, Newton, MA (US); Himani Sinhmar, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 207 days.

(21) Appl. No.: 18/589,946

(22) Filed: Feb. 28, 2024

(65) Prior Publication Data

US 2025/0271860 A1 Aug. 28, 2025

(51) Int. Cl.

| | |
|---|---|
| ***G05D 1/644*** | (2024.01) |
| ***G05D 1/622*** | (2024.01) |
| *G05D 107/40* | (2024.01) |
| *G05D 109/20* | (2024.01) |

(52) U.S. Cl.

CPC ............ *G05D 1/622* (2024.01); *G05D 1/644* (2024.01); *G05D 2107/40* (2024.01); *G05D 2109/20* (2024.01)

(58) Field of Classification Search

CPC ...... G05D 1/2465; G05D 1/467; G05D 1/606; G05D 1/622; G05D 1/644; G05D 2105/89; G05D 2107/40; G05D 2109/20; G05D 2109/254

See application file for complete search history.

(56) References Cited

U.S. PATENT DOCUMENTS

| | | | | |
|---|---|---|---|---|
| 2012/0158219 A1* | 6/2012 | Durling | .................... | G08G 5/26 701/4 |
| 2021/0302921 A1* | 9/2021 | Kolter | .................. | G05B 13/027 |

(Continued)

OTHER PUBLICATIONS

Convens, B. et al. (2021). Invariant set distributed explicit reference governors for provably safe on-board control of Nano-quadrotor swarms. Frontiers in Robotics and AI, 8. (Year: 2021).*

(Continued)

*Primary Examiner* — Matthew J. Reda
(74) *Attorney, Agent, or Firm* — Gene Vinokur

(57) ABSTRACT

A system and/or a method for controlling the movement of a vehicle in a constrained environment subject to a disturbed vehicle model including uncertainty on the dynamics governing the movement of the vehicle, collects a feedback signal indicative of a state of the vehicle and a setpoint for controlling the vehicle according to a task and determine a robust invariant set centered on the setpoint for the operation of the vehicle in an unconstrained environment using the disturbed vehicle model. The robust invariant set is inflated equally in all directions until a termination condition defined by the constraint environment is met to produce a safe invariant set enabling control of the operation of the vehicle according to the task while maintaining the state of the vehicle within the safe invariant set.

19 Claims, 28 Drawing Sheets

(56) References Cited

U.S. PATENT DOCUMENTS

| | | | | |
|---|---|---|---|---|
| 2022/0234570 | A1* | 7/2022 | Berntorp | B60W 30/04 |
| 2023/0281511 | A1* | 9/2023 | Geiger | G05B 19/0426 |

OTHER PUBLICATIONS

Convens B, Merckaert K, Vanderborght B and Nicotra MM (2021) Invariant Set Distributed Explicit Reference Governors for Provably Safe On-Board Control of Nano-Quadrotor Swarms. Front. Robot. AI 8:663809. doi: 10.3389/frobt.2021.663809.

Nicotra, Marco & Naldi, Roberto & Garone, Emanuele. (2016). A robust explicit reference governor for constrained control of Unmanned Aerial Vehicles. 6284-6289. 10.1109/ACC.2016.7526657.

Garone, Emanuele & Nicotra, Marco. (2015). Explicit Reference Governor for Constrained Nonlinear Systems. IEEE Transactions on Automatic Control. 61. 1-1. 10.1109/TAC.2015.2476195.

* cited by examiner

MOTION PLANNING AND CONTROL WITH MULTI-STAGE CONSTRUCTION OF INVARIANT SETS

TECHNICAL FIELD

This invention relates to path planning and control of vehicles subject to disturbances and modeling errors, and more particularly to how such motion plans can be determined by computing robust invariant sets and how these sets can be used to modify an unsafe reference trajectory to become safe.

BACKGROUND

Path planning includes computing feasible motions that move a vehicle from one state (position, velocity, rotation etc.) in some initial set to another state in some terminal set. This is often combined with constraints to ensure safety, and formulated as an optimization problem wherein quantities such as time and fuel consumption are minimized. However, there are several domain-specific disturbances that affect the accuracy of such motion plans, and knowledge of these may improve performance at the cost of increasing the computational burden of the planner. However, even if the disturbances are estimated, all possible realizations of modeling errors and misspecifications of the disturbances need to be considered to formally guarantee operational safety of the vehicle.

When operating vehicles such as unmanned aerial vehicles (UAVs), several disturbances affect the accuracy of maneuvers, the overall cost of a mission, and its safety. As used herein, safety means the ability to control the vehicles in a manner satisfying the constraints in the presence of the disturbances. Some such disturbances can be assumed to be partially known and incorporated in the motion planning of the UAV to aid its mission. The disturbances can come from unmodelled dynamics, poorly estimated motion parameters, such as mass and inertia, estimation errors, and exogenous forces such as those induced by wind.

Several planning methods are known to rely on the mathematical properties of the differential equations that govern the motions of the vehicle by computing smooth trajectories in a lower-dimensional space. For certain types of such as surface vessels, quadrotors and differentially driven ground vehicles, such smooth trajectories can be expanded to positions, velocities, accelerations, rotations, rotation rates, forces, and torques of the vehicle at any point in time without numerical integration. Planning for smoothness in this way limits the flexibility of a planner but facilitates fast motion planning schemes and efficient replanning approaches. While ignoring the effects of disturbances, and not directly addressing minimization of signals such as the total thrust of the vehicle, such methods are widely used in practice.

While such methods can pose constraints on signals such as velocity and acceleration at specific points in time, constraints on such signals are challenging to implement at all times. Furthermore, relevant constraints such as the maximum force used by the actuators are generally nonlinear and difficult to incorporate in the optimization problem without sacrificing computational performance. If additionally considering disturbances and additional constraints on the motion plan, which often becomes a necessity for safety critical applications, this needs to be done on much shorter time horizons. The reason for this is that involving the vehicle's nonlinear differential equations and discretizing the continuous state trajectory in a set of points results in more optimization variables per time unit of the motion plan. As such, planners that explicitly constrain the motion to behave as a vehicle subject to disturbances will inevitably have to operate with shorter time horizons and approximations of the nonlinear constraints.

Additionally, disturbances such as wind in UAV planning are typically treated over short horizons, as the uncertainty of any prediction of wind speed grows significantly in time. This is particularly true for the high-frequency components of the wind, which may produce unpredictable gusts. This makes it difficult to simultaneously guarantee performance and safety over long time scales.

Accordingly, there is a need for a safety mechanism that can guarantee operational safety, such that the motion satisfies both geometric constraints and input constraints subject to important classes of disturbances and structured uncertainties in the vehicle model that may adversely affect its performance and safety if disregarded.

SUMMARY

Some embodiments are based on the realization that current methods of path planning for vehicles are either fast and operate over long horizons when planning for smoothness without incorporation of disturbance models, or more computationally heavy and can operate with descriptions of disturbances over shorter horizons while minimizing physically relevant costs and considering disturbances and modeling errors. One embodiment therefore computes robust invariant sets using a simpler vehicle model, accounting for realistic modeling errors and misspecifications in the disturbance models, such that statements can be made on how the vehicle will move at any point in time in the future, irrespective of how the disturbances and modeling errors are realized.

In embodiments such as those related to aerial vehicle planning and control, the exact shape of these robust invariant sets is not known. However, it is recognized that they can be approximated as convex shapes, e.g., ellipsoidal volumes, by formulating and solving a set of optimization problems. It is possible to approximate such sets when considering various behaviors of the vehicle modeled by structured uncertainties in the controller gains of the closed-loop system, disturbances arising from, for example, erroneously specified input disturbance models, and the effects of attitude tracking errors on the closed-loop control system. Notably, the robust invariant sets can be inflated into safe invariant sets, where all trajectories that start in the safe invariant set will eventually converge to the smaller robust invariant set and remains there for all future times, irrespective of the exact modeling errors and disturbances.

In various control applications, robust invariant sets refer to a set of states for a dynamical system that remains invariant under certain perturbations or uncertainties. These sets are useful in the analysis and design of robust control systems to ensure stability and performance in the presence of uncertainties.

In general, an invariant set for a dynamical system is a set of states such that if the system starts in this set, it remains in the set for all future time. Robustness in control theory refers to the ability of a system to maintain its performance despite variations or uncertainties in its parameters or operating conditions. A set is considered robustly invariant if, in addition to being invariant, it remains so under the influence of uncertainties or disturbances.

From specifications such as the geometry of the world and the maximum permissible thrust of the UAV, it is recognized that an unsafe motion plan computed using methods such as navigation fields or optimization-based motion planning can be made safe by considering the tracking errors in relation to the robust invariant sets and the safe invariant sets. Such methods have the advantage that the motion of the vehicle need not be characterized explicitly, as in the optimization-based approaches. Instead, the motion is implicit, and characterized by a closed-loop system response to a signal. This permits the analysis of the system response to a wide variety of disturbances. As such, it is possible to give guarantees on the safety or feasibility of a mission prior to its execution, both for conventional planning and re-planning.

In some embodiments, the unsafe motion trajectory is made safe by adjusting the rate of change of the set-point that the controlled vehicle is tracking. If the current errors are such that the system is close to the boundary of the safe invariant set, referred to as a small dynamic margin, the rate of change of the set-point is decreased to retain safety. Such embodiments represent safety mechanisms that update a continuous set-point or reference trajectory, and it is understood that such methods are compatible with optimization-based approaches for motion planning, as well as the navigation function-based approaches for motion planning.

In the navigation function motion planning approaches, a navigation function is constructed based on the obstacle geometry such that following the negative gradient of function ensures that obstacles are avoided. In some embodiments, this is done through two separate diffeomorphisms. A diffeomorphism is a structure-preserving mapping between two smooth manifolds of the same type. It allows a navigation field constructed in a simpler setting to be mapped onto more complicated problems. In contrast to the optimization-based approaches, where the motion trajectory is defined for all times, any trajectory that follows the negative gradient of the navigation field approaches the goal location specified in the mission information.

In other embodiments, the unsafe motion trajectory is made safe by formulating a graph of discrete set-points and switching between the set-points using logic that is similarly based on the current tracking errors in relation to the boundary of the safe invariant sets. It is recognized that constructing a graph based on the relationship between robust and safe invariant sets associated with the various vertices in the graph can be used to give formal guarantees on the safety at all future times, for any target set-point that is provided in the free space. In addition, it is recognized that such a method need not rely on navigation fields and optimization-based approaches. Rather, a cost encoding desirable behaviors of the vehicle can be specified as weights in the edges of the graph.

However, to facilitate such embodiments, the robust invariant sets need to be approximated. It is challenging and computationally expensive to determine such sets in the context of real-time control of dynamical systems. Robust invariant sets are often identified through reachability analysis which involves determining the set of states that can be reached by a system under various inputs and disturbances. However, the states of a dynamical system can be multidimensional, drastically increasing the computational complexity of a reachability analysis. Hence, the reachability analysis can be efficient for controlling a plant, such as a servomotor, with a limited number of states, but may be inefficient for controlling vehicles, such as autonomous vehicles, drones, etc.

In addition, the control of the vehicle is usually performed in a constrained environment defined by obstacles and other types of constraints. Performing a reachability analysis for complex dynamical systems such as vehicles controlled in a constrained environment is a computationally challenging task that is often unsuitable for embedded computational systems, such as ADAS and/or controllers of drones.

Therefore, there is a need for computationally efficient methods for computing and using robust invariant sets suitable for real-time control of the dynamical systems, such as autonomous vehicles and/or drones.

Some embodiments are based on decoupling generating robust invariant sets subject to the uncertainty of the dynamical system from generating invariant sets subject to constraints acting on the operation of the dynamical system. Specifically, it is realized that generating robust invariant sets subject to the uncertainty of the dynamical system under constraints can be solved in two parts. The first part includes generating an initial robust invariant set subject to an unconstraint model of a dynamical system including uncertainty. This initial robust invariant set accounts for uncertainty but ignores the constraints. The second part includes inflating the initial robust invariant set until the inflated initial robust invariant set hits the constraint. Some embodiments are based on recognizing that any inflation of the invariant set, i.e., increasing the invariant set equally in all directions, results in forming another invariant set. Hence, the inflation can be used to address the constraints.

Notably, the second part ignores the uncertainty of the dynamical system and focuses only on the constraints. Doing it in such a manner allows to generate the robust invariant sets subject to the uncertainty of the dynamical system operating under constraints in a computationally efficient manner.

Lyapunov functions play a role in proving that all possible trajectories in a closed-loop system remain stable, by showing that the Lyapunov function is non-increasing along the trajectories of the closed-loop system. It is recognized that the existence of a Lyapunov can be used to characterize a domain of attraction about a stable equilibrium point if one exists. When accounting for disturbances and modeling errors, this same Lyapunov function can be used to establish a robust invariant set, wherein all trajectories that are initialized in this set remain in the set for all future times irrespective of how the disturbances and modeling errors are realized. This robust invariant set can be seen as a generalization of the equilibrium point when the system is affected by disturbances.

In summary, this disclosure describes a safety mechanism based on efficient computations of safe and robust invariant sets that can make an unsafe motion plan safe given mission information with the continuous embodiment, and that can be implemented as a standalone graph-based motion planner if operating with the discrete set-points. In some embodiments, the planner and/or controller includes one or several processors and a memory having instructions stored thereon that, when executed by at least one processor, causes the planner and/or controller to collect via a combination of wired and wireless communication channels, a description of the disturbance, a high-level description of the mission, and a description of the world geometry. The processor first formulates this input data to a set of constraints and subsequently formulates an optimization problem to compute robust and safe invariant sets. The processor subsequently passes this information to the controlled vehicle, either by sharing memory or by any number of wired and wireless communication channels, and the controlled vehicle subsequently computes a safe set-point trajectory to follow using either the continuous or discontinuous embodiments of the safety mechanism.

DETAILED DESCRIPTION

In the following description, for purposes of explanation, numerous specific details are set forth to provide a thorough understanding of the present disclosure. It will be apparent, however, to one skilled in the art that the present disclosure may be practiced without these specific details. In other instances, apparatuses and methods are shown in block diagram only to avoid obscuring the present disclosure.

As used in this specification and claims, the terms “for example,” “for instance,” and “such as,” and the verbs “comprising,” “having,” “including,” and their other verb forms, when used in conjunction with a listing of one or more components or other items, are each to be construed as open ended, meaning that that the listing is not to be considered as excluding other, additional components or items. The term “based on” means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail to avoid obscuring the embodiments. Further, like reference numbers and designations in the various drawings indicated like elements.

Figure 1A:
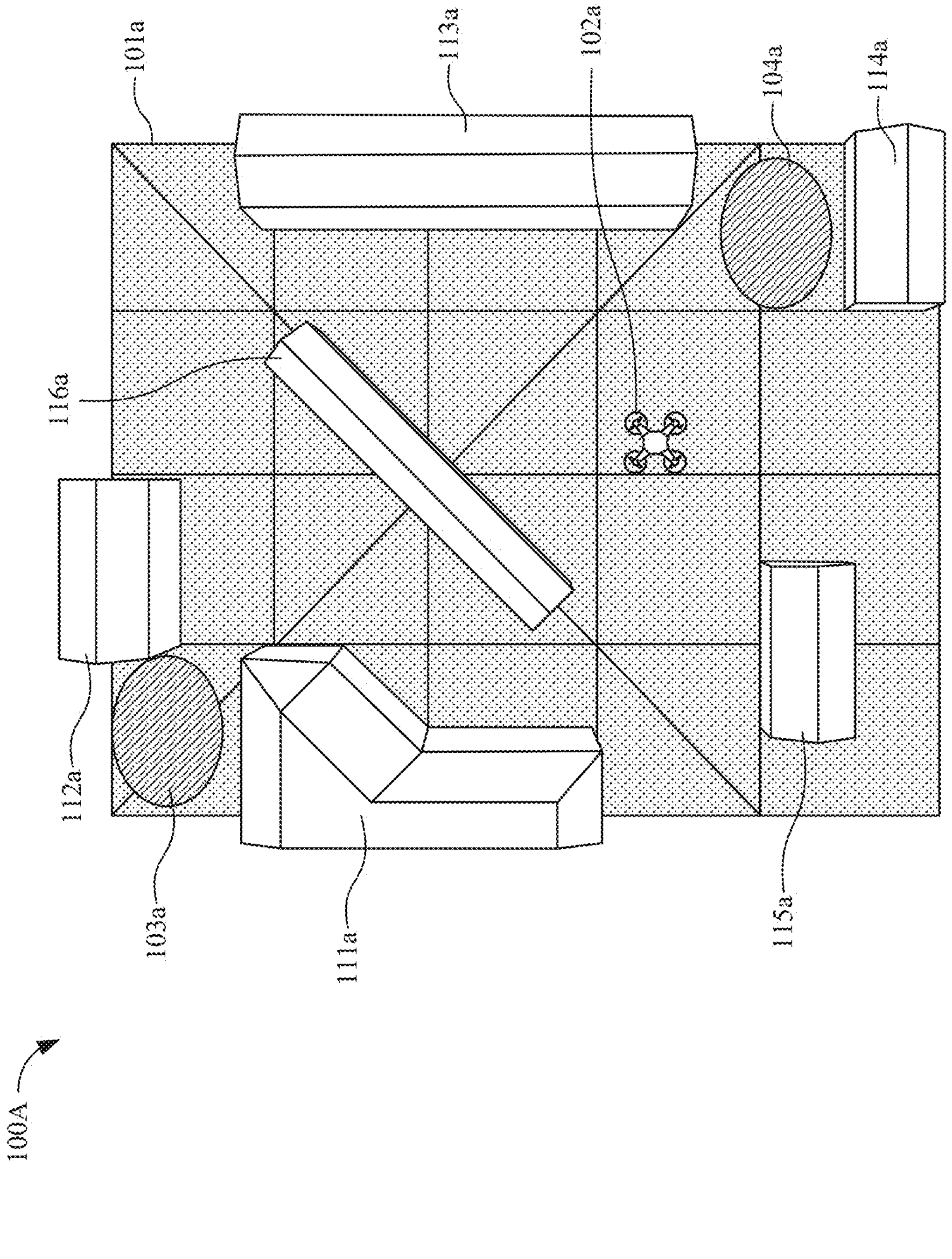
FIG. 1A illustrates an example environment where a motion plan is computed according to an embodiment of the present disclosure.

FIG. 1A illustrates an example with an environment 100*a* contained in a boundary 101*a* where a vehicle 102*a* is to move and execute a task, according to an embodiment of the present disclosure. It is an objective of some embodiments to compute a motion plan for the vehicle 102*a* from an initial state in a set 103*a* to a target state in a set 104*a*, both defined in the environment 101*a*. In one embodiment, the vehicle is provided the task of reaching the target state 104*a*, in other embodiments the vehicle is to move from state to the target state 104*a* and back while exploring a designated part of the obstacle free environment 100*a*. The state of the vehicle 102*a* may include one or a combination of a position of the vehicle 102*a*, an orientation of the vehicle 102*a*, a velocity of the vehicle 102*a*, or other states relating to its actuation.

The environment 100*a* includes obstacles 111*a*, 112*a*, 113*a*, 114*a*, 115*a*, and 116*a*. Some of these obstacles are convex, such as 112*a*, and others are non-convex, such as 111*a*. The vehicle 102*a* may be an autonomous vehicle, such as a differentially driven mobile robot, an aerial vehicle, a water surface vehicle, or an underwater vehicle. The task's performance is contingent on satisfaction of constraints on the vehicle's 102*a* motion relating to the environment 100*a*. In other words, the performance of the task is subject to the constraints. Examples of such constraints include reaching the target region 104*a*, avoiding collision with the obstacles 111*a*-116*a* (i.e., a vehicle-obstacle collision avoidance constraint), moving the vehicle 102*a* such that the state of the vehicle 102*a* (e.g., position) is within a pre-defined set of admissible states of the vehicle 102*a* (i.e., a keep-in constraint), and the like. For instance, an airborne vehicle such as a drone can be tasked to reach certain positions to inspect a structure while avoiding collisions with parts of the structure.

Figure 1B:
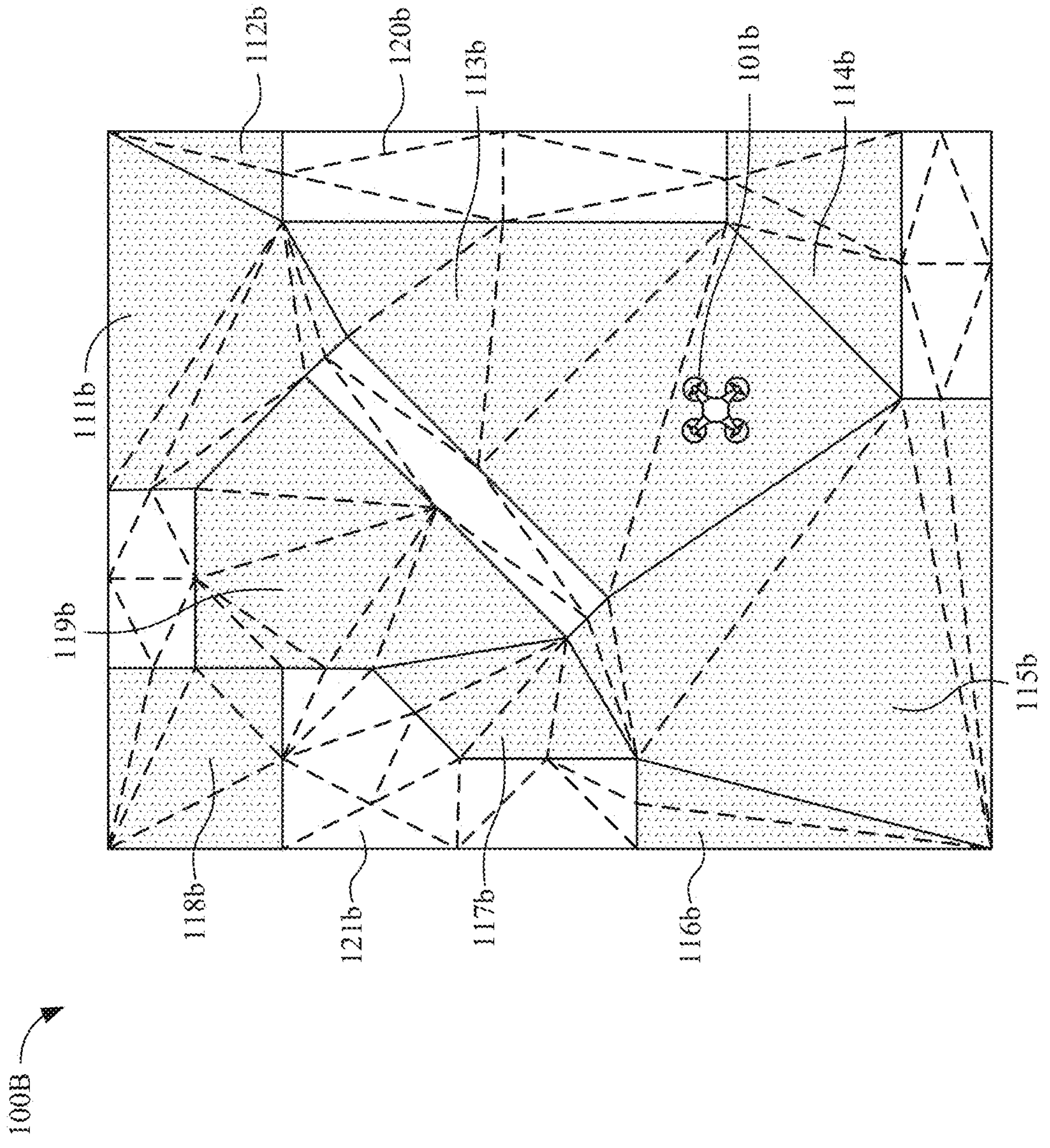
FIG. 1B illustrates how the obstacles and free space is represented as polyhedral sets according to one embodiment of the invention.

FIG. 1B illustrates how the environment 100B may be decomposed into sets of free space, in which the vehicle 101*b* is free to operate and move. In one embodiment, this is done by computing a mesh comprised of polyhedral sets 120*b* over the entire environment, before subsequently combining these smaller sets into larger sets 111*b*-119*b*. It is understood that this operation can be done in many ways, for instance using submodular coverage optimization or simpler heuristics that iteratively remove edges from the collection of edges in the mesh. The result of any such operation is a collection of sets. The union of these sets covers all the free space in some embodiments, and most of the free space in others. Similarly, the non-convex obstacles such as 121*b* can be decomposed into a set of convex obstacles. It is understood that some such decompositions may result in convex polyhedral obstacles, convex ellipsoidal obstacles, or other convex shapes whose union contain the non-convex obstacle in its interior.

Figure 1C:
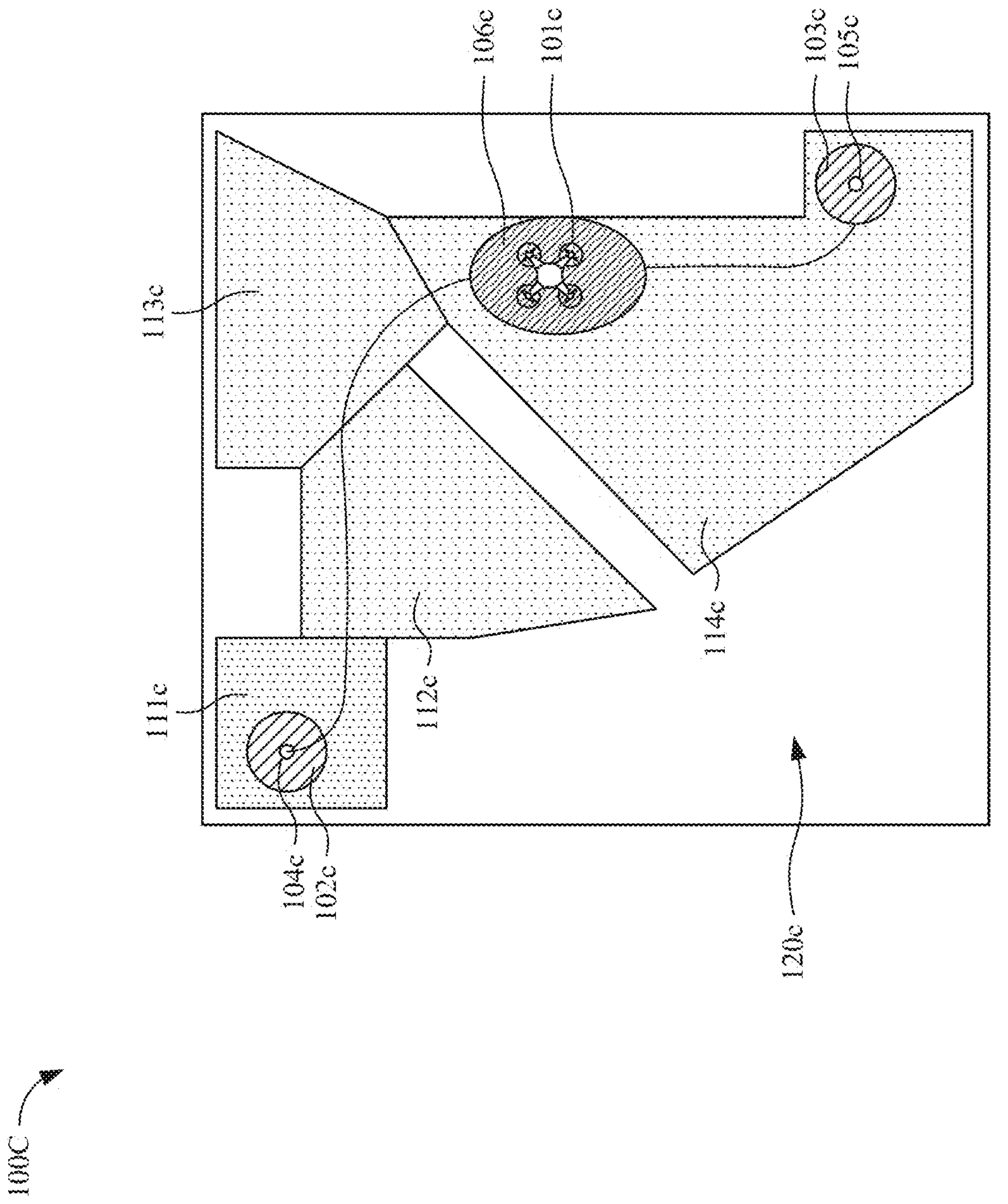
FIG. 1C demonstrates how a feasible motion plan is computed in free space, connecting a starting region with a goal region in an embodiment of the invention.

In FIG. 1C, a motion plan is depicted wherein a vehicle 101*c* is to move from a start region 102*c* to the terminal region 103*c* while passing through connected sets of free space 111*c*-115*c* and always remaining in a safe set 106*c*. In some embodiments, the segments are constrained to reside on a designated subset of free space. For instance, segment 121*c* is confined to the set 111*c*. In other embodiments, the motion is constrained to the intersection of two connected sets of free space, such that the end point of segment 111*c* is constrained to the intersection of the sets 121*c* and 122*c*. In yet other embodiments, the motion is characterized by modifying a reference such that the vehicle remains in a safe invariant set 106*c* such that it never intersects with the obstacle region 120*c*.

Figure 1D:
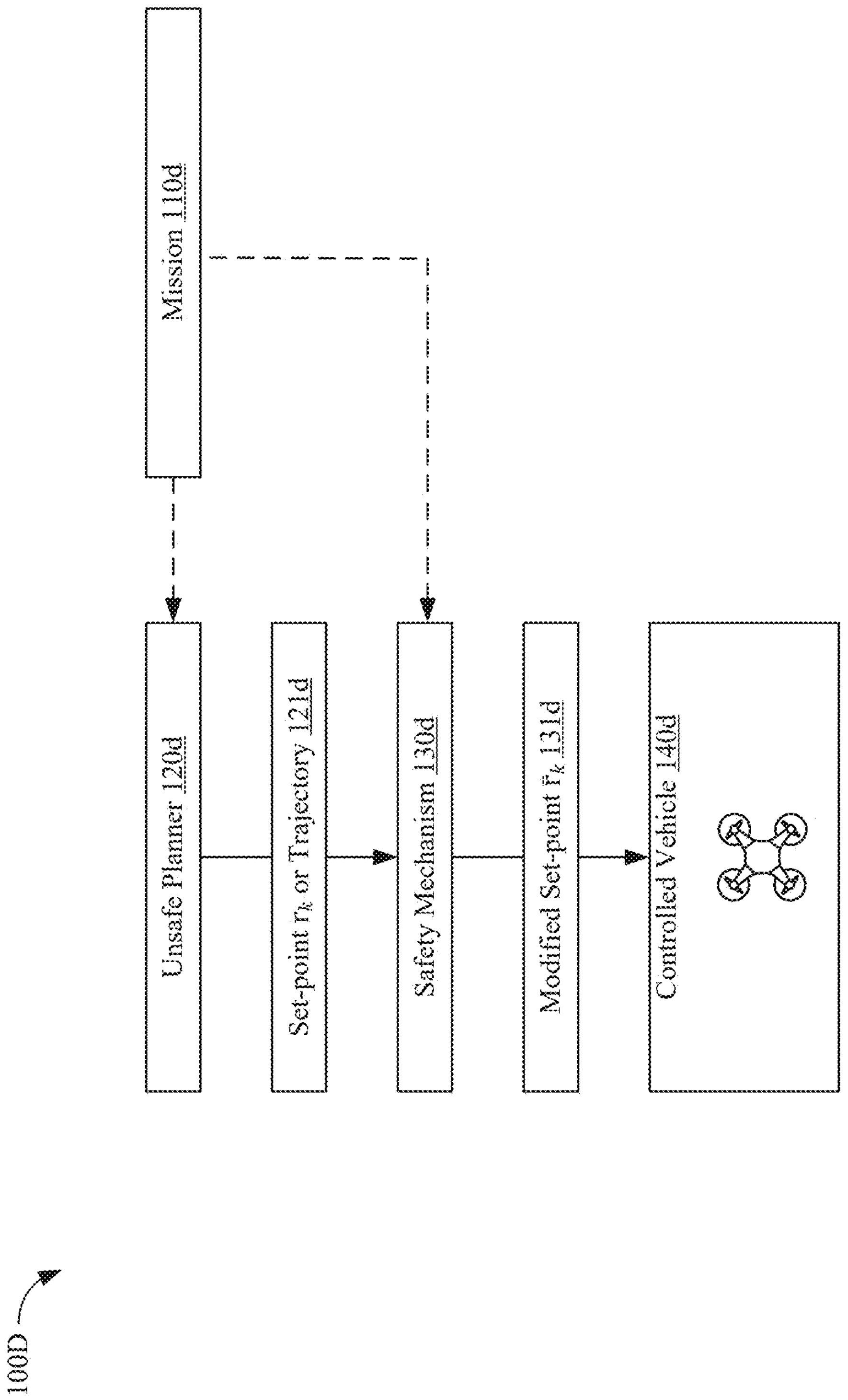
FIG. 1D shows how an unsafe planner computes a motion plan based on mission information, and how this plan is modified by a safety mechanism.

FIG. 1D illustrates how information describing a mission 110*d* is used to compute an unsafe motion plan 120*d* which is represented as a set-point or trajectory 121*d*. It is understood that some motion planners that do not compute trajectories are safe given disturbances and uncertainties in the model parameters. Consequently, the safety mechanism 130*d* modifies the set-point or trajectory 121*d* to make it safe given assumptions on the disturbances and uncertainties of the model and knowledge of the geometry of the world. The modified set-point or trajectory 121*d* is subsequently used to control the vehicle 140*d*, ensuring that its motion remains safe.

The mission 110*d* may comprise of single waypoints or a set of waypoints that the UAV should visit in sequence, or more abstract information such as tasks depending on the embodiment of the unsafe planner. Such tasks may include landing, taking off, acquiring sensory information, among other tasks. Provided that the unsafe trajectory can take the mission and compute a reference trajectory or set points for the vehicle, several types of missions are used either in isolation or conjunction.

In the following, it is understood that a vehicle that is to track a set-point has one or more controllers operating on a stabilization or tracking error to steer the vehicle towards the desired set-point. The model that takes the set-point as input and models the closed-loop behavior of the vehicle subject to this setpoint and disturbances is known as the "disturbed vehicle model." This is a dynamical system with several parameters, hereinafter referred to as gains.

Figure 1E:
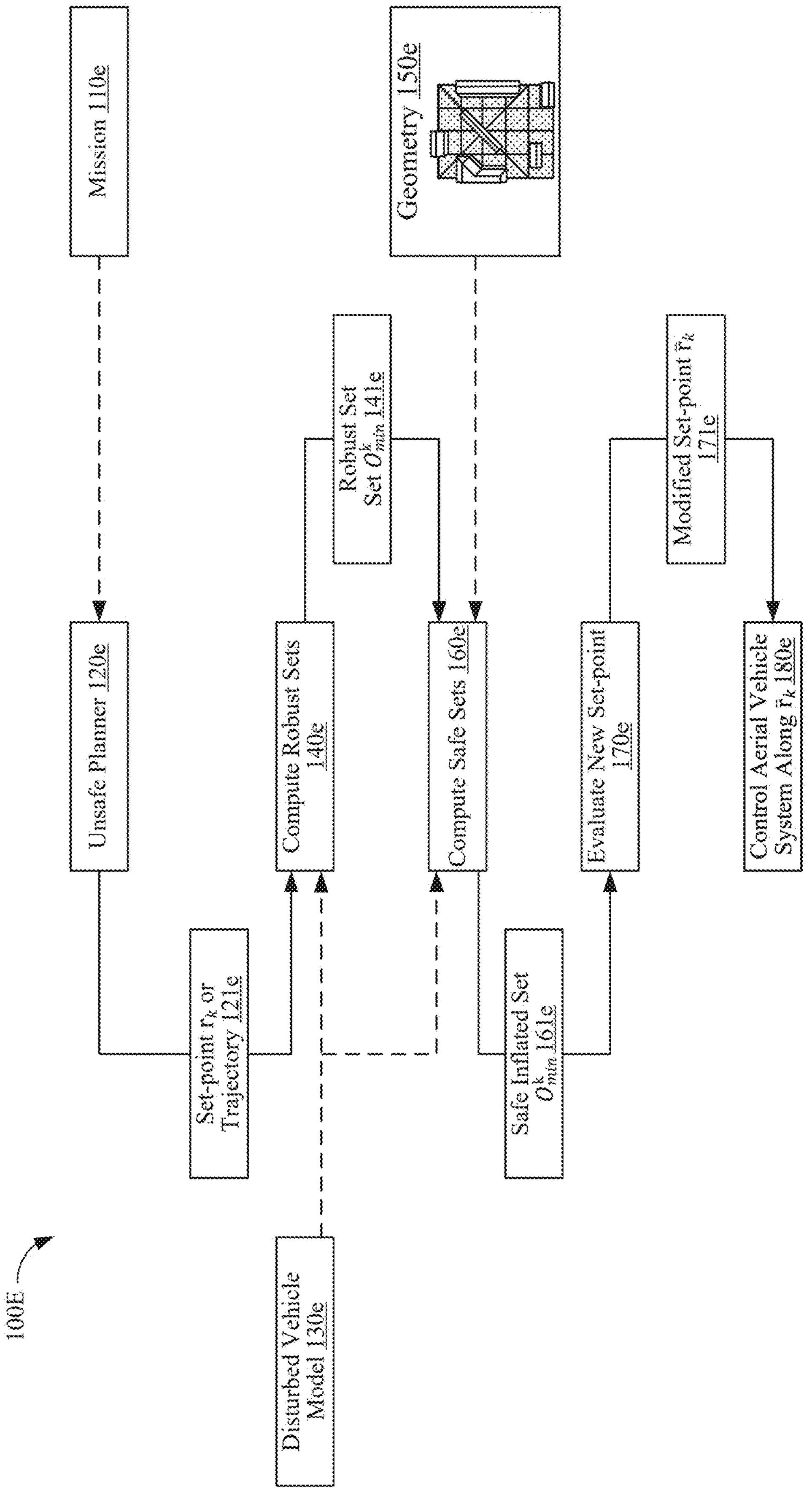
FIG. 1E details how this safety mechanism is constructed using robust and safe invariant sets, according to one embodiment of the present disclosure.

FIG. 1E details how the set-point or trajectory is modified to produce a safe reference using robust invariant sets. The mission 110*e* is passed to the unsafe planner 120*e* to compute a set-point or trajectory 121*e* which is used to compute a robust invariant set 140*e* using a vehicle model 130*e* that includes assumptions on how the disturbances interact affect the vehicle and a set to which they are confined, and structured uncertainties in the dynamics describing the time-evolution of the vehicle. In one embodiment, the vehicle mode 130*e* is a second-order differential equation with polytopic uncertainty in the parameters of the differential equation. In yet other embodiments, the disturbance is an additive input disturbance with a known bound. In yet other embodiments, the structured uncertainties are induced by errors in the attitude tracking control system of the vehicle, responsible for controlling its rotation. In another embodiment, the model has saturations limiting the maximum and minimum accelerations of the vehicle. In other embodiments, the disturbed vehicle model includes either one or more of the polytopic uncertainty in the parameters, bounded input disturbances, attitude tracking control errors, and input constraints. One such disturbed vehicle model for disturbed unmanned aerial vehicles is $$\ddot{p} = -\tilde{R}K_p(p-r) - \tilde{R}K_V v + \Delta,$$

where the disturbance is characterized by $$\Delta = m^{-1} f + g(I-\tilde{R})e_3,$$

and the disturbing force f is bounded as $\|f\| \le f_{max}$. In this embodiment, the disturbed vehicle model is characterized by a set of possible controller gains $$\mathrm{Co}(\{(K_p^i, K_v^i)\}_{i=1}^N) = K,$$

and it is assumed that the controller gains that best describe the response of the controlled vehicle resides within this set. In this case the true system response characterized by $K=(K_p, K_v) \in K$, and only known in approximate sense with the set K spanned by N known elements $$(K_p^i, K_v^i).$$

Furthermore, the embodiment includes a maximal bound on the attitude tracking error in the sense that $$\alpha = \max_{\|u\|=1} \arccos(u^T \tilde{R} u) \le \alpha_{max}.$$

It is understood that all of the parameters $$f_{max}, \alpha_{max}, \{(K_p^i, K_p^i)\}_{i=1}^N,$$

N, m, g need not be known, and that some or all of these parameters can be identified or learned from data either online or offline.

The disturbed vehicle model is used to compute a robust set 131*e*, in which the closed-loop control system will reside for all future times subject to the disturbed vehicle model 130*e*. In some embodiments, the robust set 131*e* is ellipsoidal, and in others it is polyhedral. Based on the geometry of the world in which the vehicle operates 150*e* safe robust sets are computed 160*e*. Any vehicle that starts in a safe robust set 161*e* remains in the set at all future times, and the safe robust sets are computed such that they do not intersect with the obstacles in the world. In some embodiments, the obstacles are convex or non-convex polytopes, in others they are ellipsoidal volumes, and in yet others they are a combination of both.

Based on the inflated safe sets, a new set-point 171*e* is evaluated using a safety mechanism 170*e* based on the inflated obstacles 161*e*. The modified set-point is sent to the closed loop control system and used to control the vehicle.

Figure 1F:
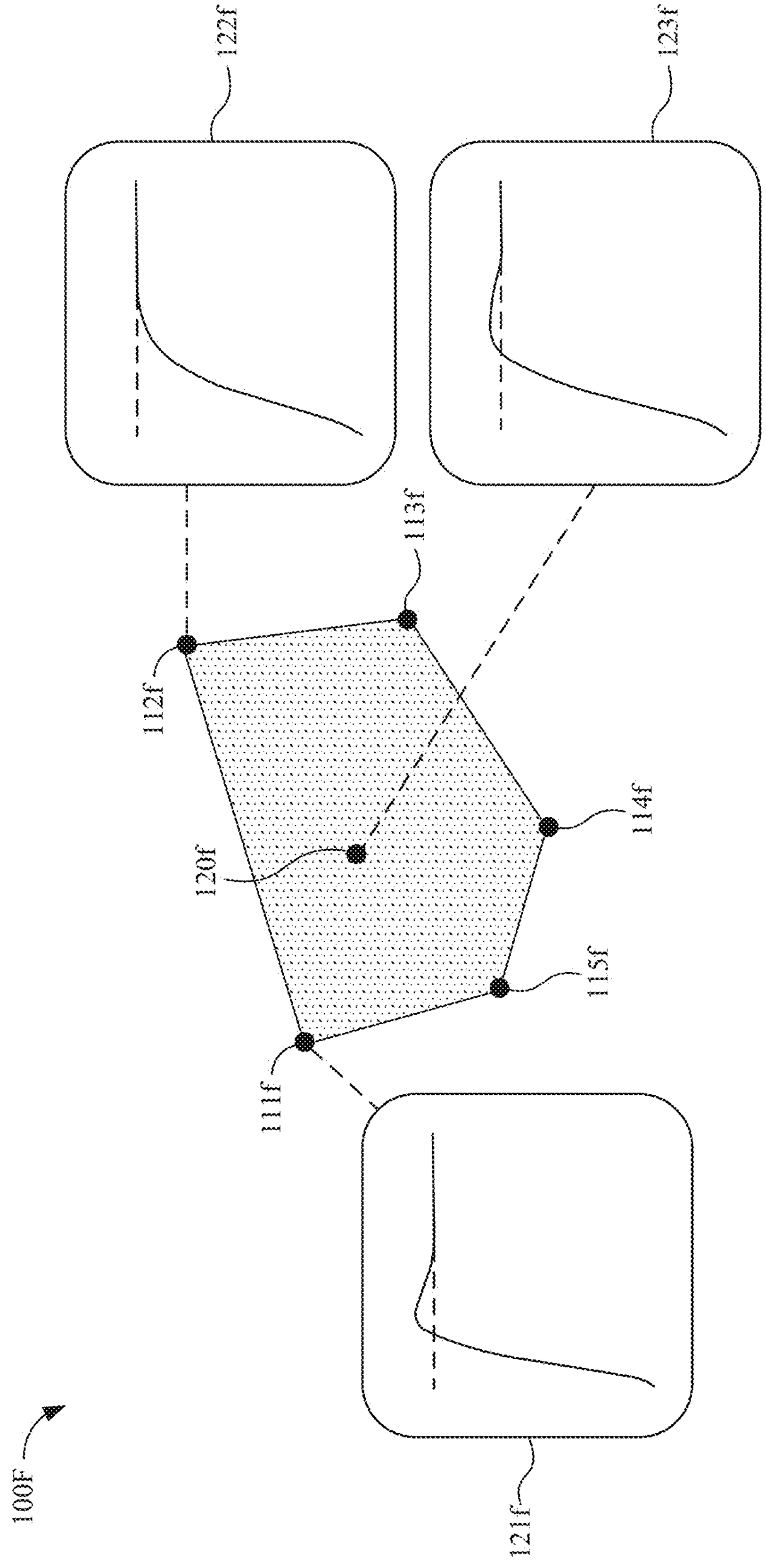
FIG. 1F illustrates the polytopic uncertainty set characterizing the possible responses of the disturbed vehicle model.

FIG. 1F illustrates the polytopic uncertainty set characterizing the possible responses of the disturbed vehicle model. The uncertainty set 110*f* is defined as $$Co(\{(K_p^i, K_p^i)\}_{i=1}^N) = \mathcal{K}$$

and spanned by a set of possible controller gains, $$\{(K_p^i, K_p^i)\}_{i=1}^N$$

111*f*, 112*f*, 113*f*, 114*f*, 115*f*, wherein each element of this set is associated with a particular system response. For example, the gains 111*f* are associated with fast and slightly under-damped response 121*f*, while the gains 112*f* are associated with a more damped and slower response 122*f*. The true gain that the controlled vehicle is best represented by $K=(K_p, K_v)$ 120*f* resides somewhere in this set, that is $K \in \mathcal{K}$. This gain 120f is not known, and associated with a system response 123*f* that is not as fast and under-damped as the response 121*f* yet not as slow and damped as the response 122*f*. It is understood that this is a simplified illustration of this set.

Computing Invariant Sets

Figure 2A:
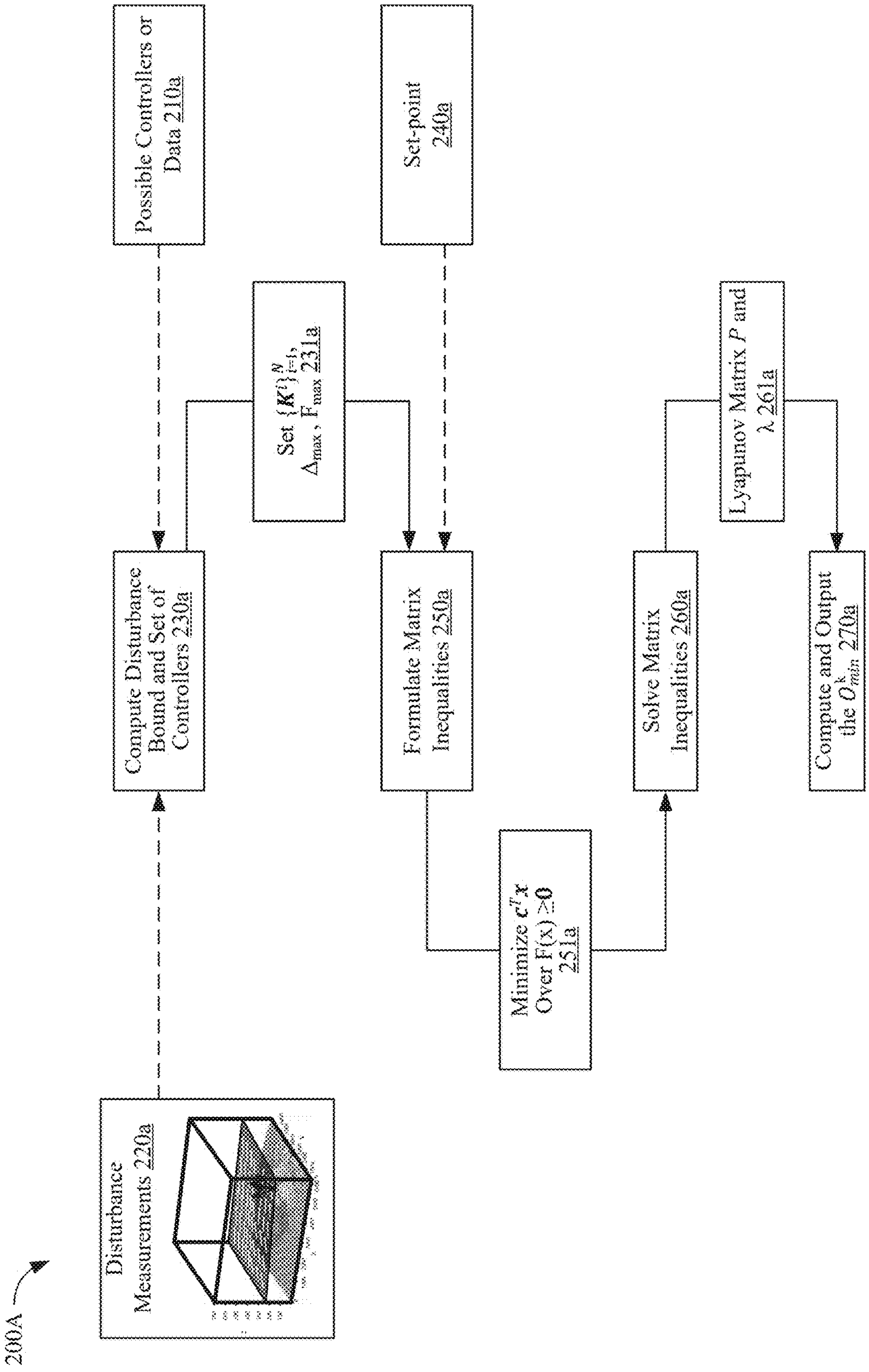
FIG. 2A contains a block diagram detailing how the robust invariant sets are computed in some embodiments.

FIG. 2A shows how the robust invariant sets can be computed by solving an optimization problem. A large set of possible controllers 210*a*, measurements by which they can be computed 220*a*, or both are used to compute a smaller set of possible controllers 230*a*. In one embodiment, the output of these computations are a set $$\{(K_p^i, K_p^i)\}_{i=1}^N$$

defining the K and the bounds on the disturbances $a_{max}$ and $f_{max}$ 231*a*. In other embodiments, only the bound Δmax is computed. Based on this information, an optimization problem is defined to minimize a linear objective $c^T x$ subject to linear matrix inequality constraints $F(x) \ge 0$ with decision variables x.

In some embodiments, this optimization problem is defined with decision variables $x=(P, \lambda)$ which characterize an ellipsoidal set. Specifically, the problem is:

$$\min_{\substack{P \in S_{++}^{6\times 6} \\ \lambda > 0}} (\lambda)$$

subject to where $$\begin{bmatrix} A_i P + P A_i^T + P & PB \\ B^T P & -\lambda I \end{bmatrix} \le 0, \forall\, i = 1, \dots, N,$$

$$P \ge I,$$

$$A_i = \begin{bmatrix} 0 & I \\ -K_p^i & -K_v^i \end{bmatrix},$$

$$B = \begin{bmatrix} 0 \\ I \end{bmatrix}.$$

In other embodiments where structured uncertainties are included, the optimization problem is defined with the decision variables $x=(P, \bar{P}, \lambda)$, and formulated:

$$\min_{\substack{P \in S_{++}^{6\times 6} \\ \bar{K} \in S_{++}^{6\times 6} \\ \lambda > 0}} (\lambda)$$

subject to $$\begin{bmatrix} A_i P + P A_i^T + P + \beta \bar{K} & PB & \sqrt{\beta} PB \\ B^T P & -\lambda I & 0 \\ \sqrt{\beta} B^T P & 0 & -I \end{bmatrix} \le 0, \forall\, i = 1, \dots, N,$$

$$P \ge I,$$

$$\begin{bmatrix} \bar{K} & K_i^T \\ K_i & I \end{bmatrix} \ge 0,$$

where $$K_i = [K_p^i \;\; K_v^i],$$

-continued $$\beta=\sqrt{2(1-\cos(\alpha_{max}))}.$$

It is understood that the latter formulation manages to incorporate the structured uncertainties generated by non-perfect attitude tracking. In both cases, the procedure results in a quadratic Lyapunov function $$V(p,r,v)=\left\|\begin{bmatrix}p\\v\end{bmatrix}-\begin{bmatrix}r\\0\end{bmatrix}\right\|_P^2.$$

Where the level set $$V(p,r,v)\leq\lambda\Delta_{max}^{-2}=V_{min}$$

is forward invariant and characterizes an inner approximation of the robust invariant set. In the context of the quadrotor UAV dynamics used in this exemplar, this corresponds to a six-dimensional hyper ellipsoid. It is understood that subject to the disturbed vehicle model, a controlled vehicle that starts tracking a set-point r will remain in the robust invariant set at all future times as long as the set-point remains constant. It is also understood that other representations and approximations of the robust invariant sets are possible, such as through zonotopes or polytopic representations.

Having formulated the optimization problem 250*a* it is solved 260*a* and the solution in terms of the Lyapunov matrix P and the bound λ 261*a* are used to compute the robust invariant set $O_{min}$ 270*a*.

Figure 2B:
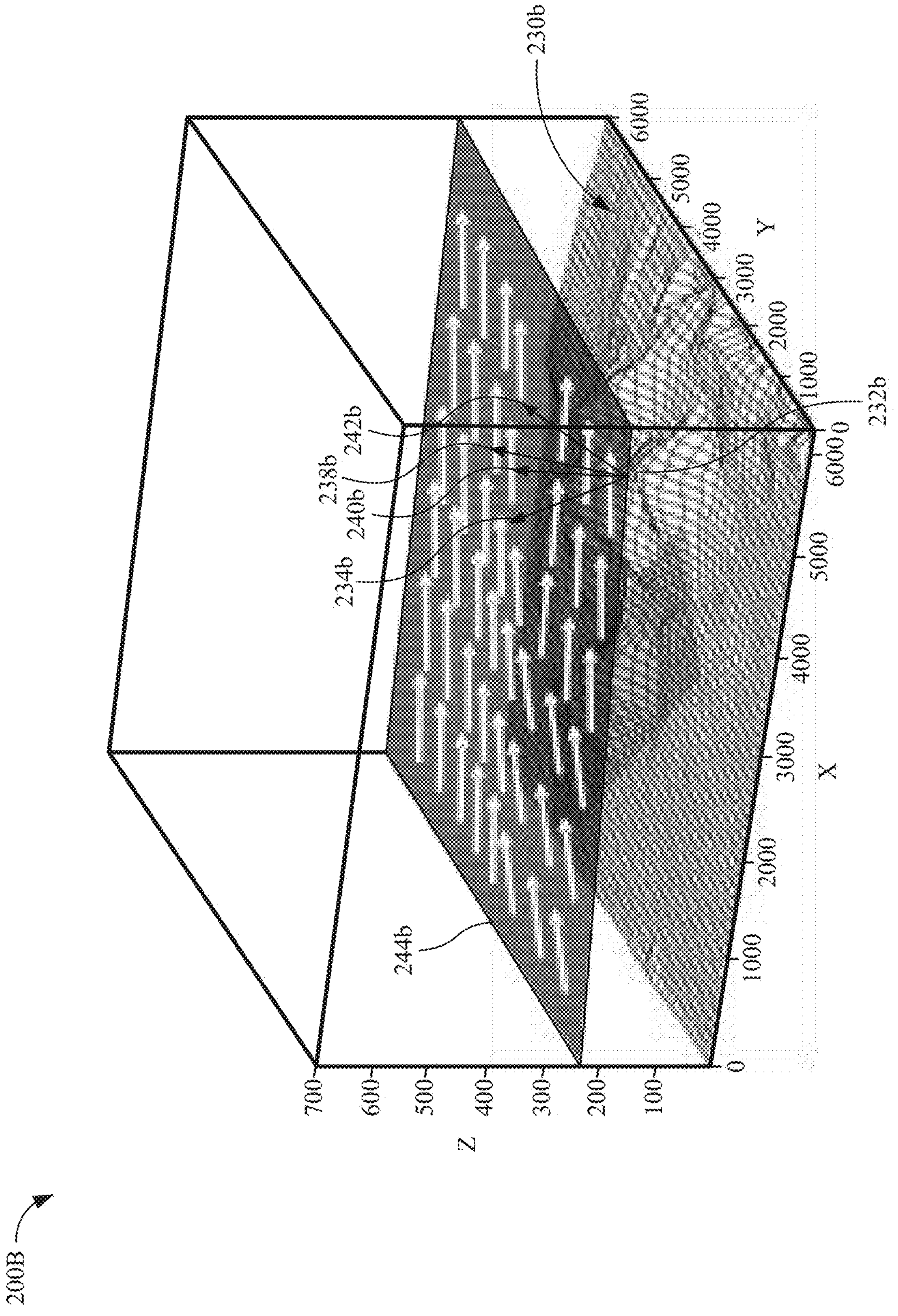
FIG. 2B illustrates an environment in which a sensor is measuring a wind field, which is an exemplar disturbance that may be used in the invention.

FIG. 2B shows a schematic of a remote sensing of wind over a complex terrain 230*b* used by some embodiments. The LiDAR sensor 232*b* arranged at a point, e.g., at a top of a hill, performs series of line-of-sight measurements on a cone including measurements 234*b*, 238*b*, 242*b* along the surface of the cone, and measurements along the center line 240*b*. The measurements are taken for different altitudes corresponding to different planes 201*b*. In such a manner, for a set of altitudes corresponding to planes 244*b*, the measurements on the cone are measurements on a circle including multiple measurements of the radial velocities in different angular directions measured at different line-of-site points on a circumference of the circle and one measurement of the radial velocity in a vertical direction measured at a center of the circle.

Some such sensors aim to determine a horizontal velocity of the wind flow for each altitude. Given these measurements, an estimate of the horizontal velocity can be determined from the measurements of the radial velocity using a geometrical relationship and assuming that the wind velocity is homogenous on each plane. Here, is the estimated velocity of the wind flow based on homogenous assumption. Some LiDAR sensors are based on recognition that, for complex terrains, such as the terrain 200B, the homogenous velocity assumption leads to a bias in LiDAR estimation of horizontal velocity. The main error is due to variation of the vertical velocity, e.g., along the hill. To that end, some sensors are based on the realization that the homogeneous velocity assumption in sensing wind flow passing over the complex terrain can be corrected using a horizontal derivative of vertical velocity. Such measurements can be used to inform the bounds of the disturbances of the controlled vehicle system.

Figure 2C:
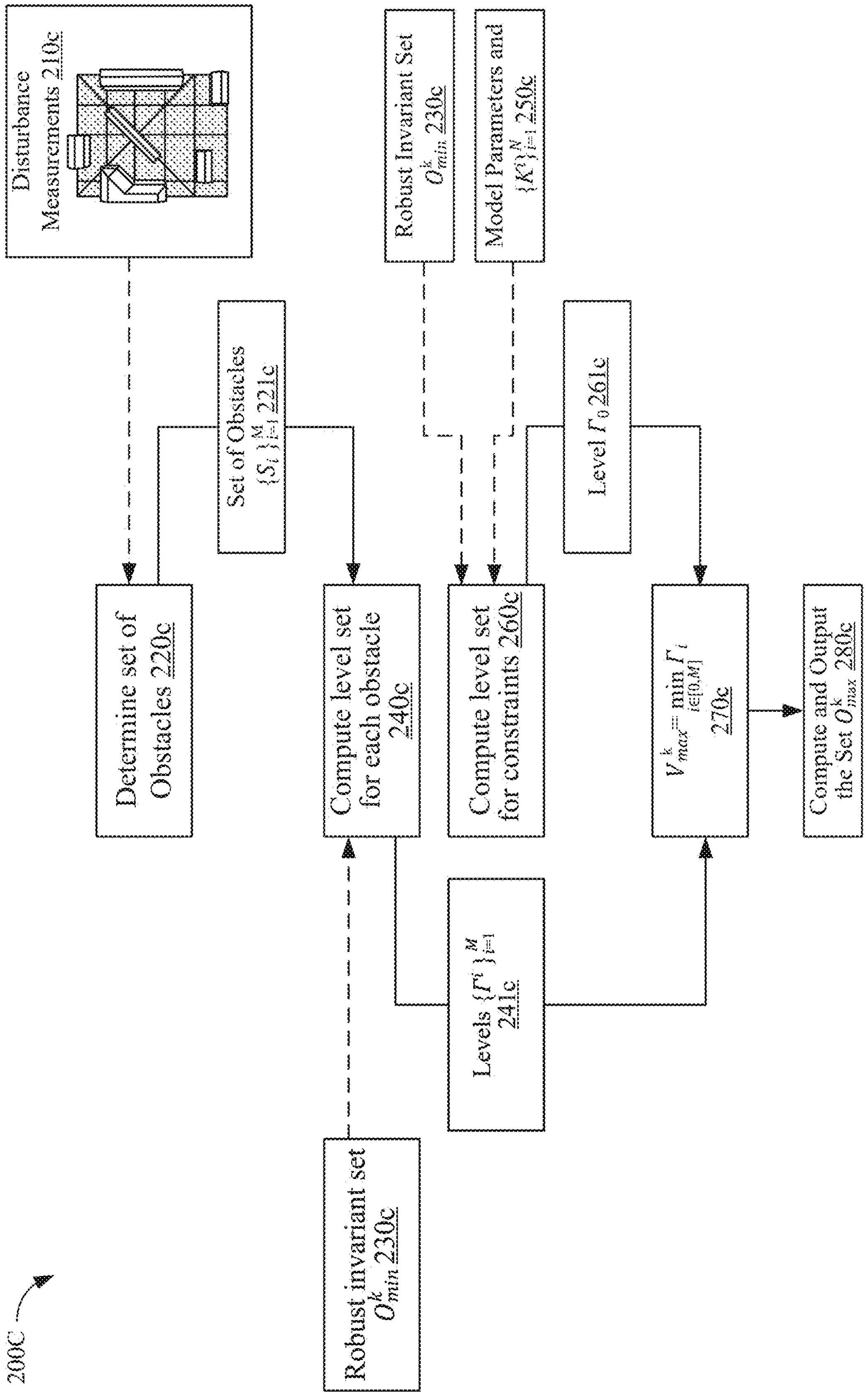
FIG. 2C details how the robust invariant sets can be inflated to compute safe invariant sets, according to one embodiment of the invention.

FIG. 2C describes how the safe invariant sets can be determined by solving a quadratic program according to one embodiment of the invention. A set of obstacles are determined 220*c* from the problem geometry 210*c*. The geometry can either be estimated or provided in terms of a mesh in formats such as a digital asset exchange file (DAE) or the Standard Tessellation Language (STL) and is then converted into a set of convex polytopes and ellipsoids, collectively referred to as the set of obstacles 221*c*. It is understood that individual obstacles from the set of obstacles 221*c* may be static or moving, or that some of the obstacles may be static and others may be moving. For each obstacle in the set of obstacles 221*c*, and a given robust invariant set 230*c* computed as described in FIG. 2B, the robust invariant set 230*c* is inflated to produce a candidate safe invariant set defined by the Lyapunov matrix and a level in the set of levels $$\{\Gamma_i\}_{i=1}^M$$

241*c*. The set 241*c* is computed by solving a quadratic program, a method of projection, or geometric heuristics to find a level set to the Lyapunov function associated with the robust invariant set 230*c*, such that all trajectories that start in the safe set remain in the safe set for all future times without colliding with an obstacle in the set of obstacles 221*c*. One such level set is computed for each obstacle in the set of obstacles 221*c*. Furthermore, given the disturbed vehicle model and the robust invariant set 230*c*, an additional level $\Gamma_0$ can be computed for the input constraints of the disturbed vehicle model 250*c*, such that all trajectories that start in the associated invariant set always satisfies the input constraints. The set of levels 241*c* and the level 261*c* are then combined to compute the largest safe set in which all geometric and input constraints are satisfied. This is done by taking the smallest level in the set of levels 241*c* combined with the level 261*c*.

$$V_{max}^k=\min_{i\in[0,M]}\Gamma_i.$$

Based on this smallest level, the safe robust set is computed and reported 280*c*, as $$O_{max}^k=\left\{x\in R^{2n}\,\middle|\,(x_e^k)^TPx_e^k\leq V_{max}^k,\ x_e^k=x-\left(r_k^T,0\right)^T\right\}.$$

It is recognized that for vehicles such as aerial vehicles, input constraints such as the maximum thrust used by the disturbed vehicle model can be considered in the context of a Lyapunov matrix P by solving an optimization problem $$\min_{(\lambda_{11},\lambda_{12},\lambda_{22})\in R^3}(\lambda)$$

subject to $$\begin{bmatrix}P & \mathrm{diag}(K_p^i,K_v^i)\\ \mathrm{diag}(K_p^i,K_v^i) & \Lambda\end{bmatrix}\geq 0,\ \forall i=1,\ \ldots\ ,N,$$

-continued $$\begin{bmatrix} \lambda_{11} & \lambda_{12} \\ \lambda_{12} & \lambda_{22} \end{bmatrix} = \Lambda,$$

$$\lambda_{11} + 2\lambda_{12} + \lambda_{22} = \lambda,$$

and subsequently computing the additional level $\Gamma_0$ as follows $$\Gamma_0 = (f_{max} - mg)^2 m^{-2} \lambda^{-1}.$$

Figure 2D:
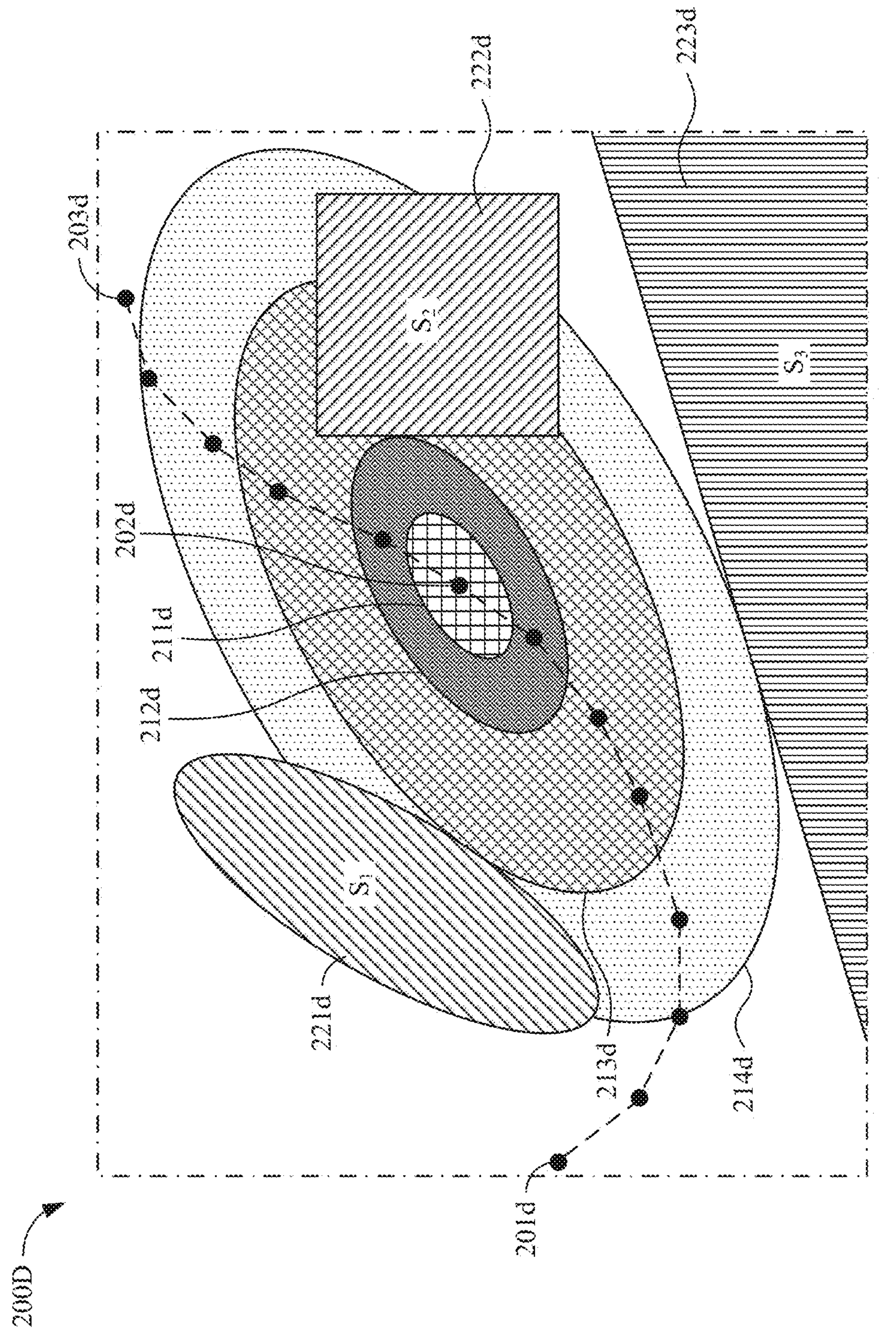
FIG. 2D details how the safe invariant sets relate to the obstacles in the environment, centered on the intended path of the vehicle.

FIG. 2D illustrates how the set of levels 241*c* are computed with respect to three obstacles in two-dimensional space. The robust invariant sets are computed for the set-points 201*d*, 202*d*, 203*d*, and is here illustrated for the set-point 202*d* with the ellipse 211*d*. By scaling this robust invariant set and its associated level, the set 201*d* is computed with respect to the ellipsoidal obstacle 2021*d* characterized by a level $\Gamma_1$ in the set of levels 241*c*, the set 212*d* is computed with respect to the polyhedral obstacle 222*d* characterized by a level $\Gamma_2$ in the set of levels 241*c*, and the set 213*d* is computed with respect to the half-plane or wall constraint 223*d* characterized by a level $\Gamma_3$ in the set of levels 241*c*. Of these, the candidate safe set 212*d* associated with the polyhedral obstacle 222*d* is contained in the other two candidate safe sets 211*d*, 213*d*. Thus, the safe robust set is determined as the invariant set 212*d* and is found by taking the minimum of the levels in the set of levels 241*c* associated with the candidate safe robust sets 211*d*, 212*d*, 213*d*. The nature of the safe invariant set 212*d* is that all trajectories that start within it remain in the set at all future times, and eventually converges to the smaller robust invariant 202*d* set in its interior. It is recognized that similar computations can be done using level sets represented as zonotopes or polyhedra, which represent separate embodiments of the present invention.

These sets can be used to ensure safety in several ways, and two such methods are described as part of the disclosure, differing in the way in which the set-points are updated. In the first, the set-point is updated continuously as the solution to an ordinary differential equation. In the second, the set-points are updated discontinuously, forming a piece-wise constant reference trajectory for the controlled system to follow. We start by describing the continuous embodiments, then detail the discontinuous embodiments, before giving implementation details.

Continuous Embodiments

Figure 3A:
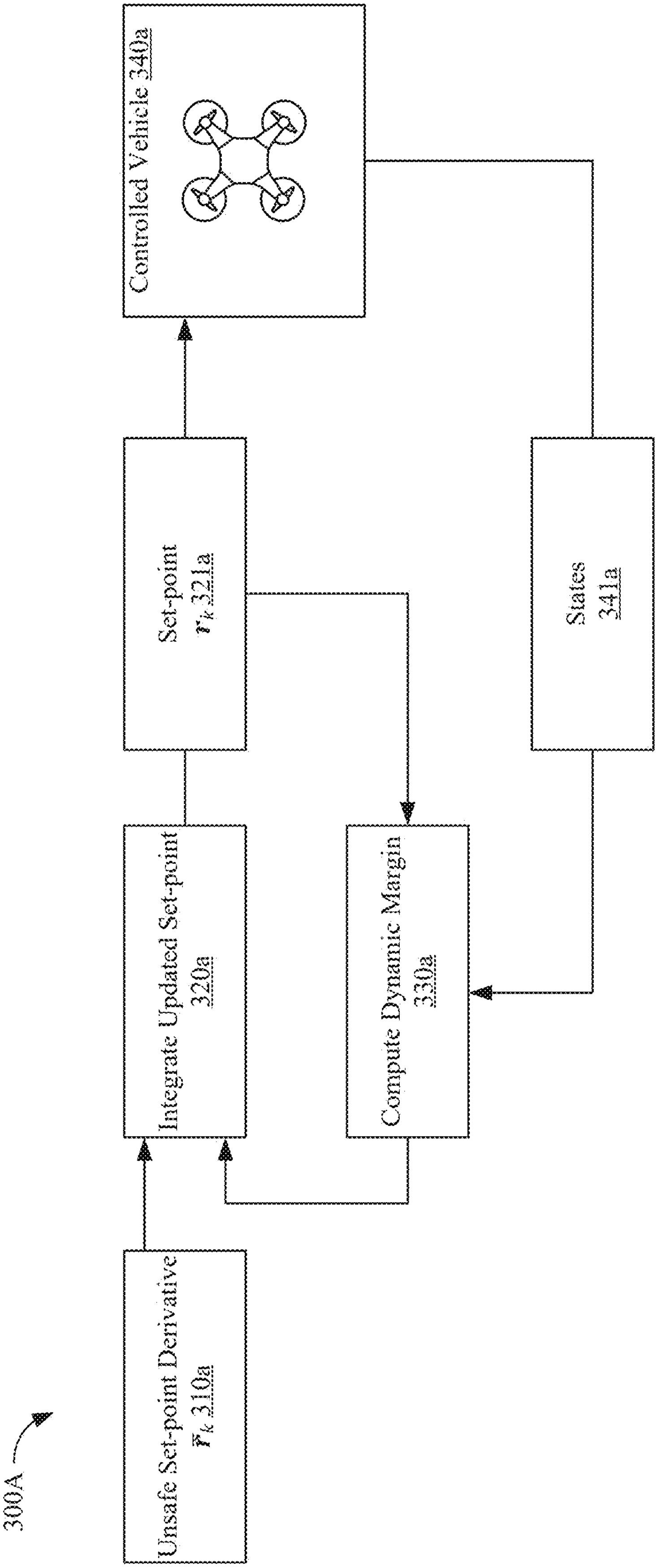
FIG. 3A contains a block diagram depicting how the safety mechanism is designed in one embodiment of the invention.

FIG. 3A details a block diagram of a safety mechanism where the set-points are updated in a continuous manner. The unsafe set-point time derivative 310*a* is provided to the safety mechanism and is used in the integration of the differential equations 320a governing the time-evolution of the safe set-point 321*a*. This differential equation is defined by the dynamic margin 330*a*, which is computed using the safe invariant sets from 200C and 200D centered at the current safe set-point 321*a*. In one embodiment related to aerial vehicle control, the controlled vehicle 340*a* is a quadrotor and its states contain the positions and velocities of the system in three dimensions. In this embodiment, the dynamic margin is computed by comparing the Lyapunov function evaluated in the current state of the vehicle to the level of the associated safe invariant set. The difference between the two constitutes the dynamic margin 330*a*. In one embodiment of the invention, the dynamic margin is computed as $$M(p, v, r_k) = V_{max}^k - V(p, v, r_k),$$

where $$V_{max}^k$$

is the level associated with the safe invariant set computed at $r_k$. The differential equation governing the time-evolution of the set-point is:

$$\dot{r}_k = kM(p, v, r_k)\dot{\bar{r}}_k$$

where κ is a positive gain. This differential equation can be integrated in time to update the set-point. It is understood that the initial condition of this differential equation is critical to ensuring safety, and that it can be set from on the initial state of the controlled vehicle 340*a*.

Figure 3B:
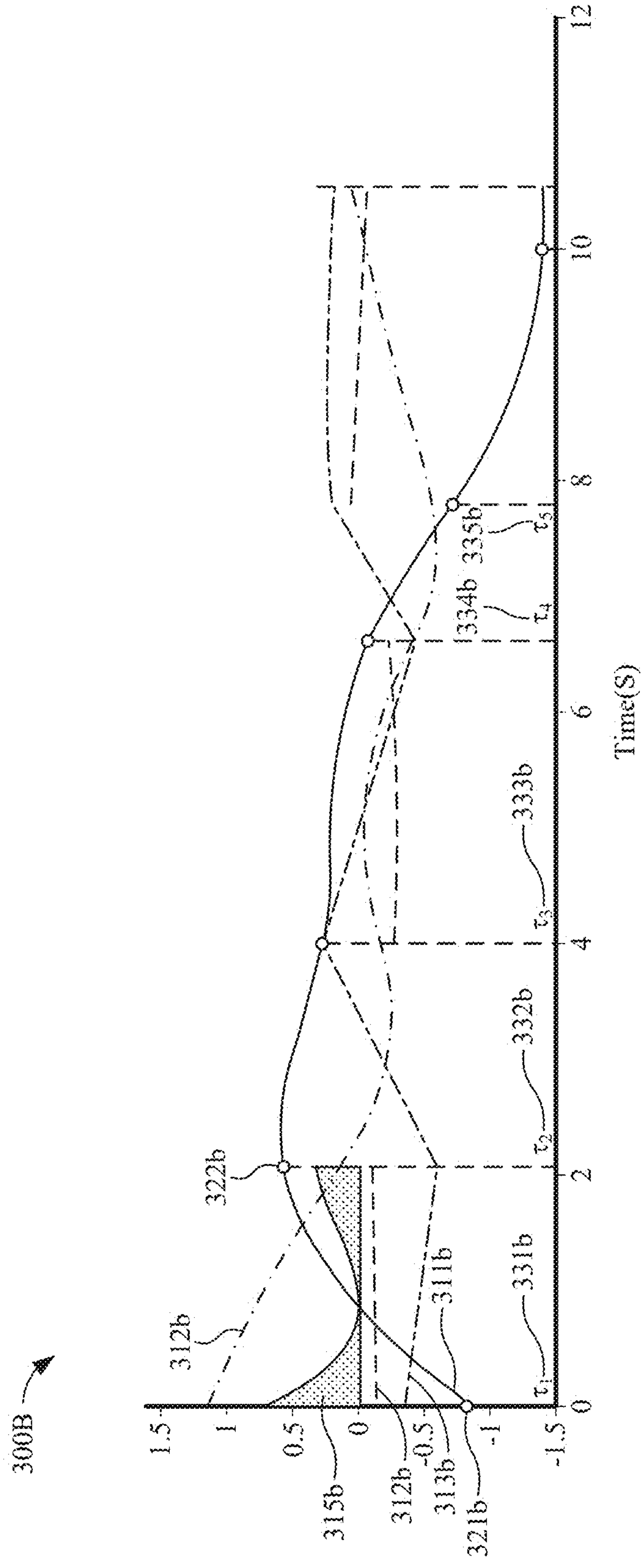
FIG. 3B illustrates an unsafe trajectory computed using optimization-based methods, used as input in one embodiment of the safety mechanism.

FIG. 3B shows segments of the path/motion plan of the vehicle illustrated in one dimension of the flat output space of the controlled vehicle 340*a*, according to some embodiments of the present disclosure. the motion of the vehicle is parameterized by the sequence of splines as parameterized curves, and wherein the parametrized curves include one or a combination of polynomials, Bezier curves, B-splines, truncated Fourier series, and Legendre polynomials. It is understood that any other representation of the path that is linear in motion parameters can be used in place of these parametrizations. The path includes m segments, wherein each segment is defined with a duration $T_i = \tau_i - \tau_{i-1}$, defined in the end times 331*b*, 332*b*, 333*b*, 334*b*, 335*b*. In FIG. 3B, a position trajectory (0th derivative) 111*f* and its first three derivatives: velocity (1st derivative) 112*f*, acceleration ($2^{nd}$ derivative) 113*f* and jerk (3rd derivative) are depicted.

In some embodiments, such trajectories are computed by minimizing objective functions expressing the total variation of the position trajectory, indicated by 315*b* for the first segment of the trajectory. In others, the trajectory is computed by a weighted sum of the total variation of the position and all higher derivatives. In yet others, the trajectory is computed to minimize a cost combining a total variation objective with a cost functional in the forces, torques and other signals present in the closed-loop vehicle control system. In other embodiments, the optimization minimizes the total time $\Sigma_i T_i$. In some embodiments, the optimization objective comprises all or some of these costs, and optimizes the trajectory subject to endpoint constraints 321*b*, 322*b* and continuity constraints. It is understood that an optimization of this kind is computed for a vehicle model in an idealized setting and may result in trajectories that are not safe when considering input disturbances and obstacles given a disturbed vehicle model. In the potentially unsafe motion plan depicted in FIG. 3B, the velocity set-point trajectory is continuous in time and can be evaluated. In some embodiments, this unsafe position set-point time derivative is used as input to the safety mechanism 301*a* depicted in FIG. 3A.

In yet other embodiments, the set-point time derivative is encoded as a vector field expressed as a function of the positional space herein referred to as a navigation function.

Figure 3C:
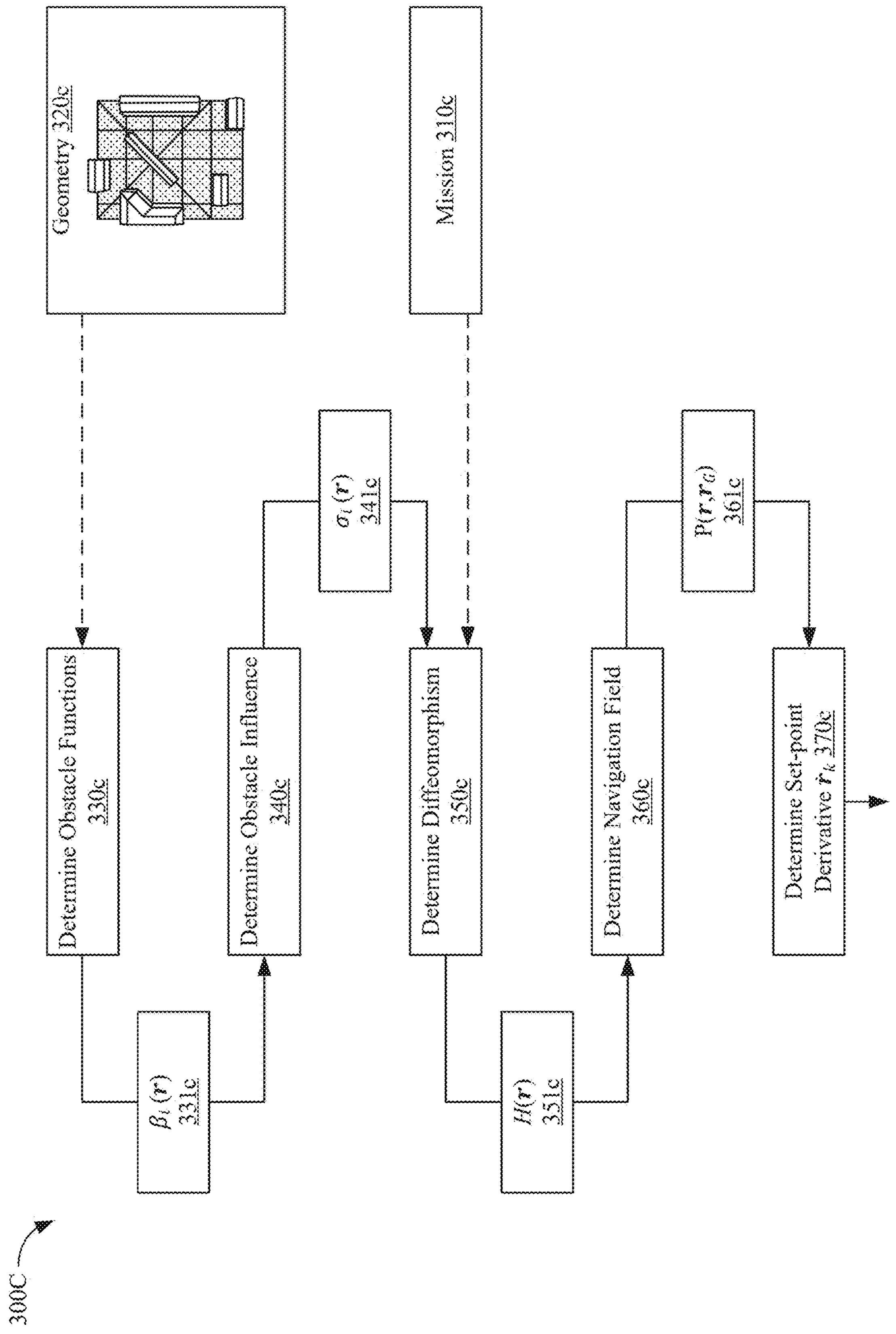
FIG. 3C shows a block diagram indicating how the reference can be computed using a navigation function, used in one embodiment of the invention.

FIG. 3C depicts how such a navigation field can be constructed and evaluated to form the unsafe position set-point time derivative that is used as input to the safety mechanism 301*a* depicted in FIG. 3A. Based on the problem geometry 320*c*, obstacle and boundary functions can be determined 330*c*. The obstacle and boundary functions associate each point in space with a positive value that increases when moving away from each individual obstacle 111*a*, 112*a*, 113*a*, 114*a*, 115*a*, and the boundary of the world 101*a*, respectively. From these functions, obstacle and boundary influence functions are computed 340*c*. The influence functions 341*c* associate each point in space with a value that increases when moving toward the obstacle or boundary. From these influence functions, and with knowledge of the goal location provided by the mission information 310*c*, a diffeomorphism can be computed 350*c* that associates each point in the world with polyhedral obstacles 320*c* to a world in which the obstacles are spheres, henceforth referred to as the sphere world.

A diffeomorphism is a structure-preserving mapping between two smooth manifolds of the same type. It is an invertible function that maps one differentiable manifold to another, in this case the original geometry and the sphere world, such that both the function and its inverse are continuously differentiable. Given that such a diffeomorphism 351*c* exists, and based on the mission information 310*c* that contains a goal location, a navigation field can be constructed 360*c* in the sphere world where all trajectories converge to the goal location provided by the mission without intersecting any of the obstacles in the sphere world. The gradient of this navigation field can subsequently be evaluated through the diffeomorphism to produce a vector field in the original geometry. From this navigation vector field, the position set-point time-derivative can be evaluated at any point in space.

The computation of a navigation field is an alternative to the optimization-based trajectory computation in FIG. 3C, and similarly produces a positional set-point time derivative that is used as input to the safety mechanism 310*a* in some embodiments of the invention. Next, we provide additional details on how the obstacle functions and diffeomorphisms are computed.

Figure 3D:
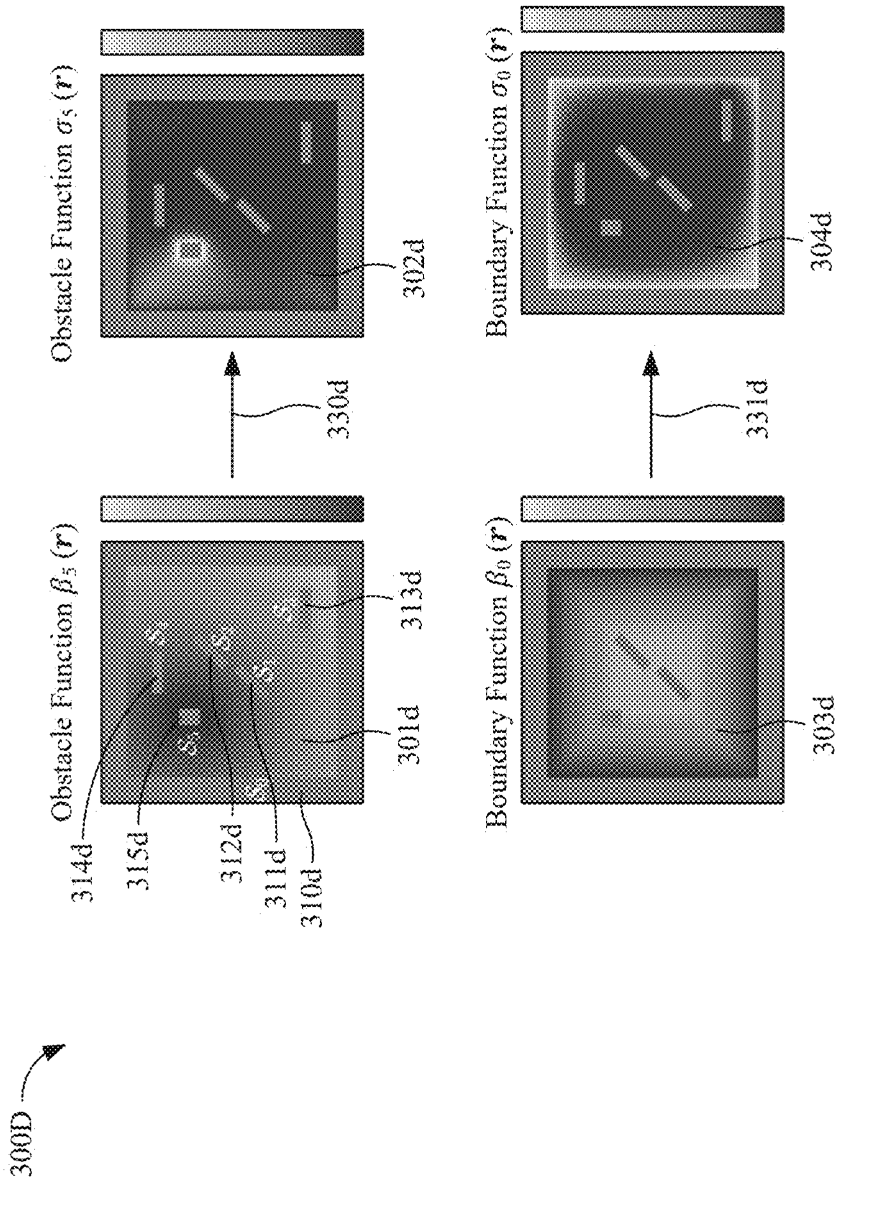
FIG. 3D illustrates the shape of the obstacle functions and their resulting influence functions in one embodiment of the present disclosure.

FIG. 3D demonstrates how the obstacle and boundary functions 331*c* can be computed and subsequently converted into obstacle and boundary influence functions 341*c*. The obstacles are represented as polyhedral sets 301*d*, 302*d*, 301*d*, 304*d*, 305*d*, and the obstacle function computed for obstacle 305*d* is shown as 301*d*. It is recognized that this obstacle function can be computed in many ways, for example by numerical optimization in solving a quadratic program (QP) to find the nearest point to the obstacle and taking the Euclidean distance as the obstacle function $$\beta_i(r) = \min_{q \in S_i} \|q - r\|.$$

This function is defined in the exterior of any obstacle, and one such function is computed for each obstacle. From these obstacle functions, we can construct a set of obstacle influence functions 330*d*. It is understood that one way of doing this is as follows $$\sigma_i(r) = \frac{\gamma_k(r)\overline{\beta}_i(r)}{\gamma_k(r)\overline{\beta}_i(r) + \theta\beta_i(r)},$$

where $$\overline{\beta}_i(r) = \prod_{j=0 \text{ or } j \neq i}^{M} \beta_j(r)$$

$$\gamma_k(r) = \|r - r_G\|^{2k}$$

The obstacle influence function computed for obstacle 305*d* is shown as 302*d*.

Similarly, it is recognized that the boundary function 303*d* for the boundary 310*d* can be defined in terms of a distance from a point in its interior to the boundary. The boundary function is thus defined only in the interior of the boundary. This function can similarly be converted 331*d* using the above expressions to a boundary influence function 304*d*. Using these functions, we next detail how to compute the diffeomorphism, which is henceforth split into two components. The first component is a scaling diffeomorphism, and the second is the mapping from the scaled polyhedral world to the sphere world.

Figure 3E:
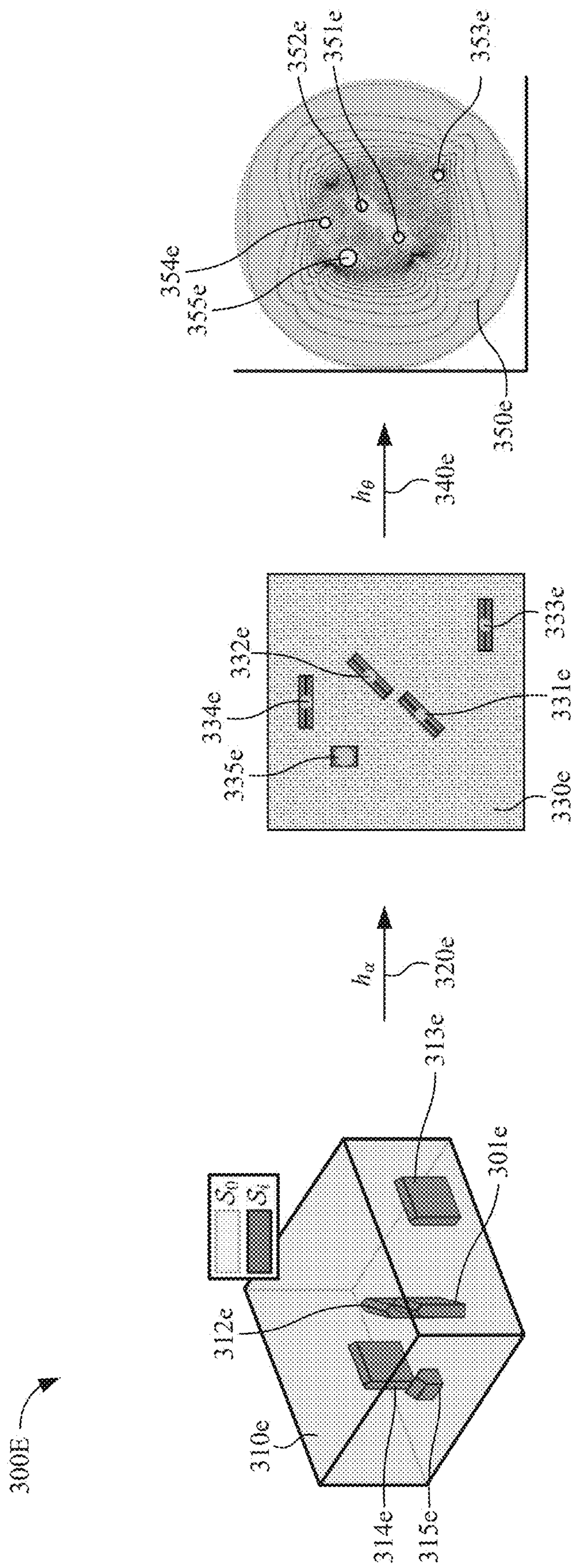
FIG. 3E shows how a polyhedral workspace with polyhedral obstacles can be mapped to a spherical world with spherical obstacles which is used to constructing the navigation field in one embodiment.

FIG. 3E illustrates how the first differmorphisms map points in space from a polyhedral unscaled world to a scaled polyhedral world 320*e*, here viewed from above, and how this transformed polyhedral word is mapped via the second differomorphism to the sphere world 340*e*. In the polyhedral worlds, the obstacles 311*e*, 312*e*, 313*e*, 314*e*, 315*e*, 331*e*, 332*e*, 333*e*, 334*e*, 335*e* are polyhedral obstacles of different size in the scaled and unscaled worlds. These are mapped to spherical obstacles 351*e*, 352*e*, 353*e*, 354*e*, 355*e* in the sphere world. The first diffeomorphism is a simple linear scaling, chosen such that the unscaled polyhedral world fits into a unit sphere. This map is defined by $$h_\alpha(r) = \alpha r,$$

For a positive scaling parameter α. The second differomorphism is computed based on the obstacle influence functions as follows $$h_\theta(r) = \left(1 - \sum_{i=0}^{M} \sigma_i(r)\right) r_G + \sum_{i=0}^{M} \sigma_i(r) T_i(r),$$

where $$T_i(r) = \sqrt{1 + \beta_i(r)}\,\frac{r - w_i}{\|r - w_i\|} r_i + w_i,$$

$$T_i(r) = \sqrt{1 - \beta_0(r)}\,\frac{r - w_0}{\|r - w_0\|} r_0 + w_0.$$

The parameters $$\{(r_i, w_i)\}_{i=0}^{M}$$

determine the shape of the obstacles and boundary in the target sphere world. When passing points in the unscaled polyhedral world first through $h_a$ 320*e* and then through $h_\theta$ 330*e*, these points are mapped to unique points in the sphere world 350*e*, as shown in FIG. 3E.

Figure 3F:
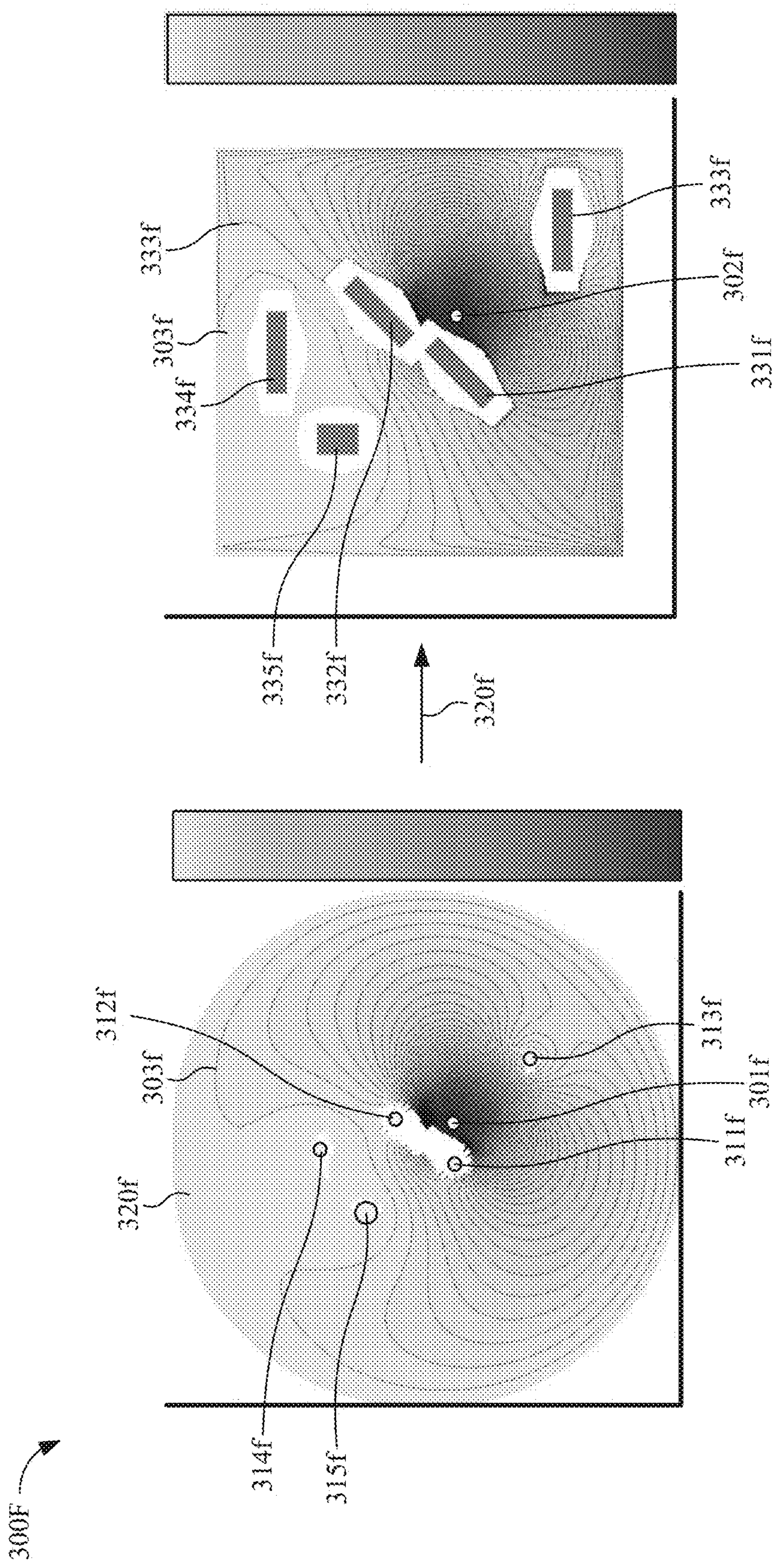
FIG. 3F shows a navigation field in the spherical world, and how this translates into the coordinates of the original polyhedral world.

FIG. 3F shows how a navigation field in the sphere world is mapped to a navigation field in the original scaled polyhedral world using the inverse of the two diffeomorphisms. The navigation function is defined such that all solutions moving in the negative gradient of the field converge to the goal position 301*f*, while avoiding the spherical obstacles 311*f*, 312*f*, 313*f*, 314*f*, 315*f* when moving orthogonality to the level sets 303*f* in the direction of the negative gradient. It is understood that a suitable navigation field can be computed as $$\hat{\varphi}(r; r_G) = \frac{\|r - r_G\|^2}{\left(\|r - r_G\|^{2k} - \prod_{i=0}^{M} \beta_i(r)\right)^{1/k}},$$

When transformed back to the original polyhedral world 320*f* using a composition of the first diffeomorphism 320*e* and the second diffeomorphism 330*e*, the resulting navigation field 332*f* is such that all solutions moving in the negative gradient of the field converge to the goal position 302*f*, while avoiding the polyhedral obstacles 331*f*, 312*f*, 313*f*, 314*f* when moving orthogonality to the level sets 333*f* in the direction of the negative gradient. Consequently, specifying the goal location in the mission information, and knowing the obstacles, the navigation function of the sphere world and its gradient can be evaluated at any point in the interior of the world boundary, excluding the interior of the obstacles. It is understood that the resulting gradient can be taken as the set-point time derivative used as the unsafe reference to the safety mechanism, with $$\dot{\bar{r}} = -\frac{\nabla\varphi(r; r_G)}{\|\nabla\varphi(r; r_G)\|},$$

where $$\varphi(r; r_G) = (\hat{\varphi} \circ h_\theta \circ h_a)(r; r_G).$$

Figure 3G:
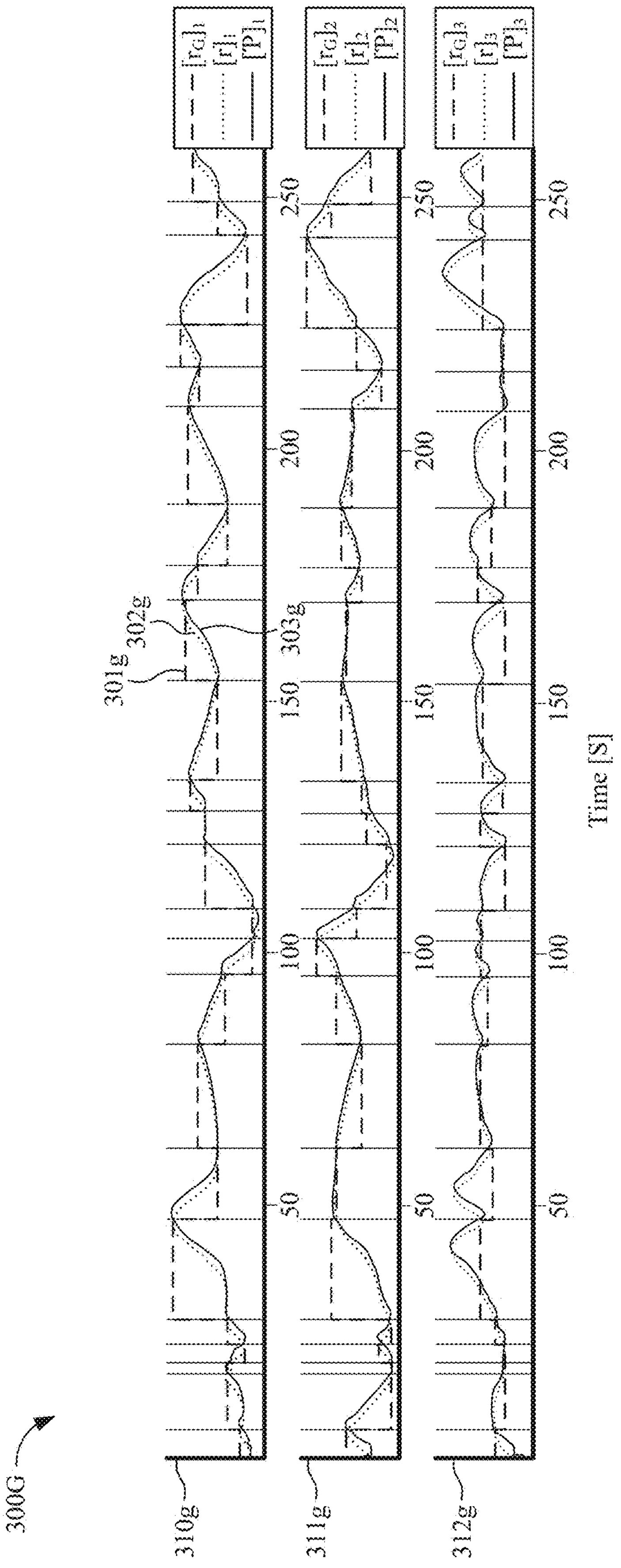
FIG. 3G illustrates how a controlled vehicle tracks a modified reference with new missions being sent to the controlled system at different points in time.

FIG. 3G illustrates how different goal locations are provided to the safety mechanism, here piece-wise constant, and how the set-point trajectory computed by the safety mechanism in the x, y, and z dimensions, 310*g*, 311*g* and 311*g*, respectively. The actual positions of the quadrotor lags the intended set-point, but that the set-point is modified in such a way that this tracking error never becomes unsafe. The speed of the quadrotor varies depending on how close it is to an obstacle, and it safely traverses the space while satisfying input constraints, despite the original trajectory produced by the navigation field not being safe.

This represents one embodiment of the safety mechanism, but it is understood that the unsafe reference time derivative can be exchanged for other motion plans, such as the optimization-based motion plan used in other embodiments of the invention.

Figure 3H:
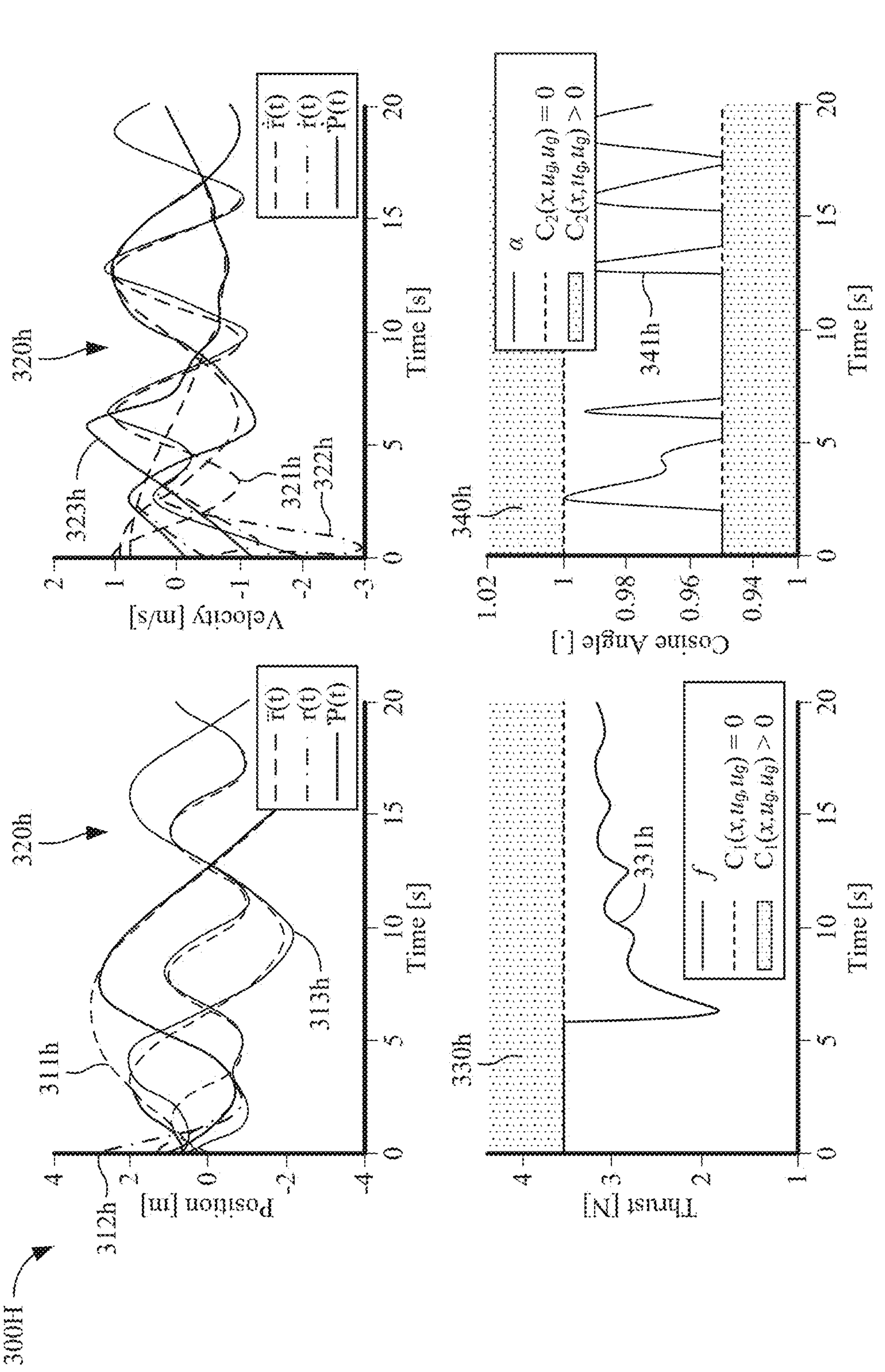
FIG. 3H shows an embodiment in which the invariant sets are used in a model predictive control framework to continuously update the reference trajectory.

FIG. 3H shows a schematic illustrating an embodiment where the disturbed vehicle model is controlled subject to constraints formulated as a non-linear optimization program and solved in a receding horizon framework, also known as model predictive control. The optimization problem is formed such that a safe setpoint trajectory r(t) 312*h* is computed in order to modify an original unsafe positional setpoint trajectory $\bar{r}$(t) 311*h* such that the position p(t) 313*h* of the disturbed vehicle model resides in a safe invariant set at all times. In this embodiment, the safe invariant sets can be enforced as nonlinear constraints along each point of the prediction horizon. In this case, it is understood that solving the nonlinear optimization problem entails that the disturbed vehicle model resides in a safe invariant set at all times. In this exemplar, a constraint associated with the maximum thrust of an aerial vehicle 331*h* and a maximum tilt of the aerial vehicle 340*h* are shown to reside within their bounds at all times.

Discontinuous Embodiments

Another embodiment of the invention is to update the set-point trajectory in a discontinuous manner, where the ordinary differential equation used to integrate the position set-point is replaced by a sequence of constant set-points and logic to switch between the set-points.

Figure 4A:
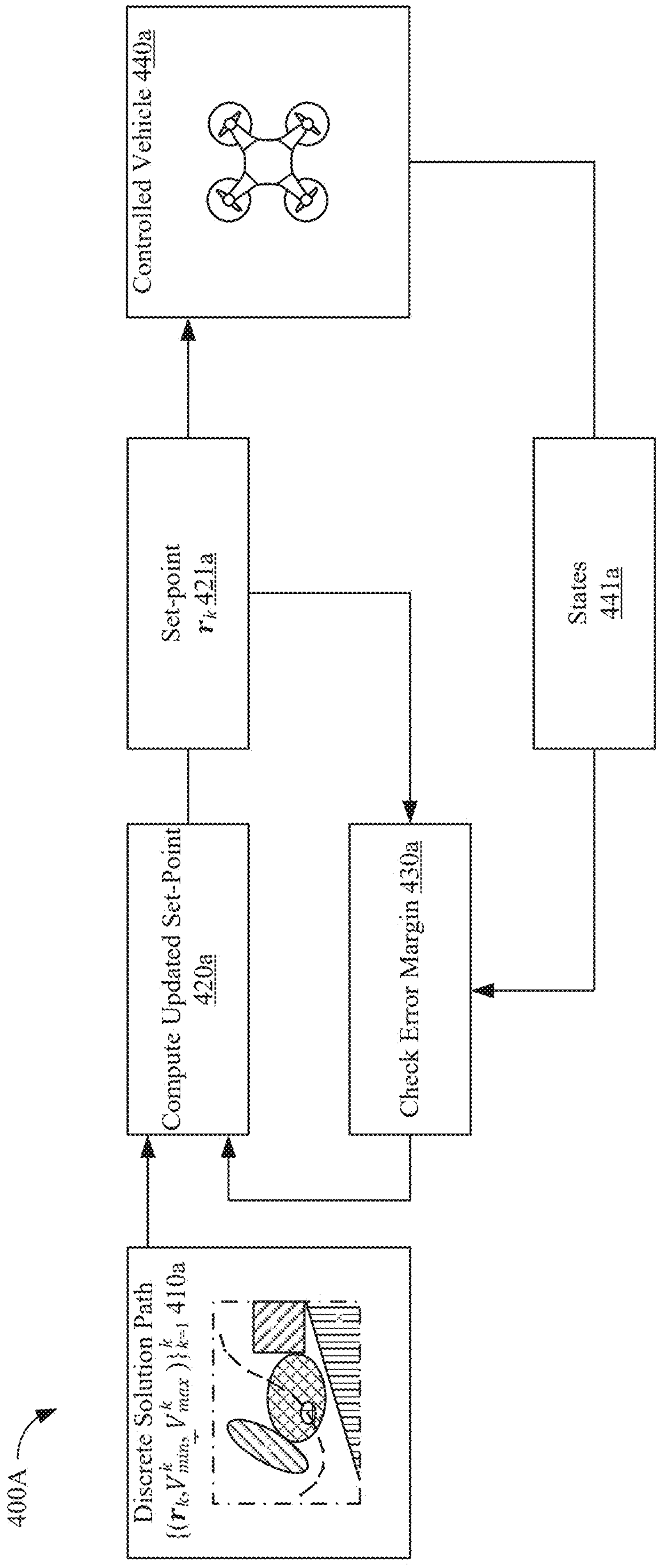
FIG. 4A contains a block diagram depicting how the safety mechanism is designed in one embodiment of the invention.

FIG. 4A discloses an embodiment where a discrete solution path 410*a* is provided as a sequence of position set-points, whereupon the position set-point is updated 420*a* while controlling the vehicle 440*a* based on checking an error margin 430*a*, similar to the dynamic margin in FIG. 3A. To compute the error margin which dictates when it is safe to switch set-points, the system requires knowledge of the set-point 421*a* and the states of the system 441*a*. In one embodiment, the controlled vehicle is a quadrotor, and the states of the system 441*a* comprise its position and velocity. In this embodiment, the set-points are three-dimensional points in space. In other embodiments, the set-points 421*a* are two or one-dimensional points in space, or discrete configurations in a higher-dimensional configuration manifold.

Next, we detail how safety can be ensured when switching the set-point 420*a* using the robust invariant sets 230*c* and safe invariant set 212*d* computed in FIGS. 2A and 2C, respectively. We then disclose how the solution path 410*a* can be computed and describe this in terms of a graph $\mathcal{G}$ containing a set of vertices $$\mathcal{V} = \{\mathcal{V}_i\}_{i=1}^{L}$$

and a set of edges $\mathcal{E} \subseteq \mathcal{V} \times \mathcal{V}$ connecting some of the vertices. Each vertex in the graph is associated with a set-point in space, $r_k$, a robust invariant set 230*c* to which all safe motions converge given the disturbed vehicle model, and a safe invariant set 212*d* that contains the robust invariant set. The nature of safe invariant set 212*d* is that all solutions initialized in its interior remains safe for all future times, and eventually converge to the robust invariant set 230*c*.

Figure 4B:
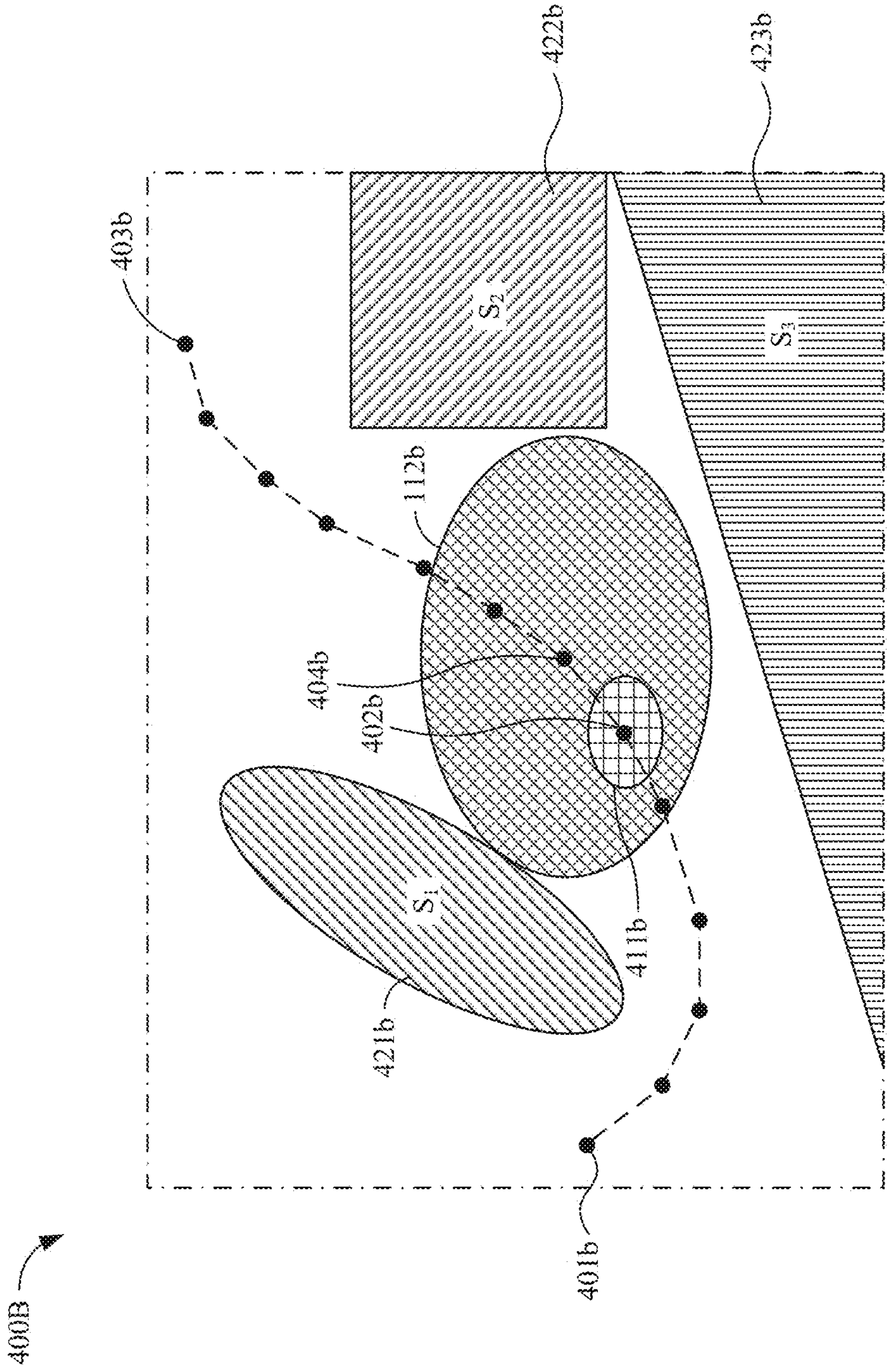
FIG. 4B shows how to define the connectivity of the graph from the robust and safe invariant sets to form a path from initial vertex with a terminal vertex.

FIG. 4B explains how the graph is constructed in the discrete embodiment and the error margin used when switching set-points. A sequence of set-points is computed from the initial vertex 401*b* to the terminal vertex 403*b*, as provided by the mission information and the initial location of the system. The intermediary vertex 402*b* is a candidate in this solution path. It is understood that, if it exists, we have previously computed a robust invariant set 411*b* and a safe invariant set associated with this set-point in space given the geometry of the world, the disturbed vehicle model, and the position set-point associated with the vertex. Then, if the robust invariant set 411*b* associated with the vertex $\mathcal{V}_k$ 402*b* is contained in the safe invariant set 112*b* of another vertex $\mathcal{V}_{k+1}$ 404*b*, then any$^A$T trajectory started outside the robust invariant set 411*b* of the vertex $\mathcal{V}_k$ 402$_b$ will, if it remains safe, converge the robust invariant set 411*b* if the controlled vehicle system is tracking its associated set-point. If so, the system will eventually converge to the interior of the safe invariant set 112*b* of another vertex $\mathcal{V}_{k+1}$ 404*b*, at which point it is safe to switch set-points.

A robust invariant set contained in the interior of the safe invariant set 112*b* of another vertex thus implies that a transition between the two vertices will be possible in that direction and can be used to define a directed edge in the graph. The construction of this graph will be explained shortly, and with it a solution path connecting the initial vertex 401*b* and the terminal vertex 403*b* can be computed.

Furthermore, if the controlled vehicle is steered toward a set-point associated with the intermediary vertex 402*a*, then as soon as it enters the safe invariant set 112*b* of the next vertex 404*a* in the path, it will be safe to switch the set-points. The distance between the current state of the vehicle and the safe invariant set of the next vertex in the path is referred to as the error margin 430*a* and dictates how the discrete set-points are updated in 420*a*. We start by describing how the graph can be constructed and searched, before detailing the switching logic and computation of the error margin.

Figure 4C:
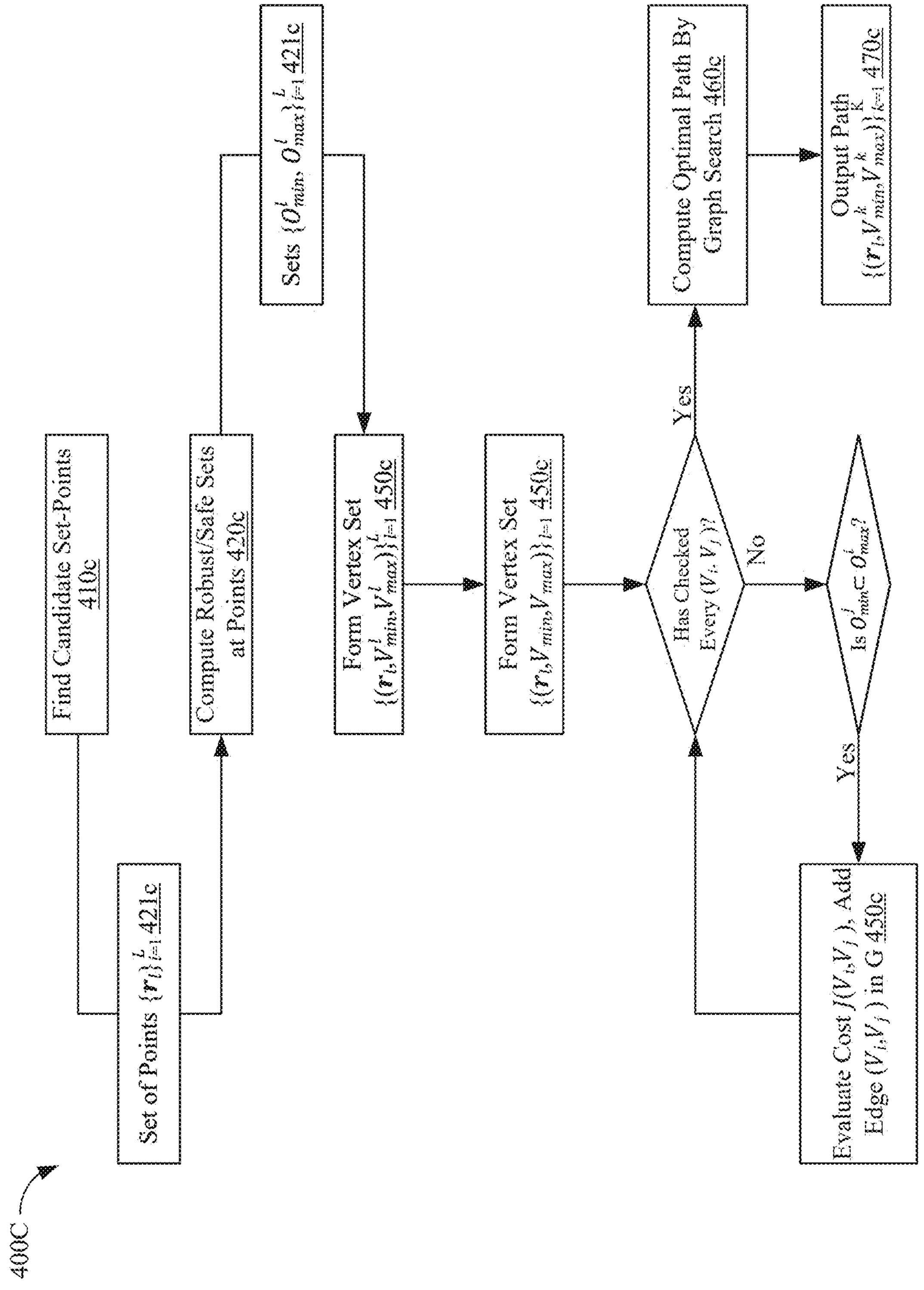
FIG. 4C shows how the connectivity of the graph is determined according to one embodiment of the present disclosure.

FIG. 4C details how the graph is constructed and searched according to one embodiment of the present disclosure. A set of candidate set-points 411*c* are generated in the space that the vehicle is to operate in 410*c*. It is understood that this can be done using a lattice-based construction generating a set of candidate set-points uniformly in space, as discussed in relation to FIG. 4D, or by sampling candidate set-points randomly in space. In some embodiments, regions close to obstacles are given a higher likelihood of containing a set-point if the sampling is not uniform. The set of candidate set points $$\{r_l\}_{l=1}^{L}$$

are then used to compute 420*c* robust invariant sets 230*c* and safe invariant sets 212*d* as described previously in relation to FIGS. 2A, 2C, and 2D. The sets are then used to compute 450*c* a large vertex set $$\{\mathcal{V}_i\}_{i=1}^{L}$$

460*c* containing $$\{(r_l, V_{min}^l, V_{max}^l)\}_{l=1}^{L}.$$

For each pair ($\mathcal{V}_i$, $\mathcal{V}_j$) of candidate vertices in the vertex set $$\{\mathcal{V}_i\}_{i=1}^{L},$$

it is checked if the robust invariant set associated with $\mathcal{V}_i$ is contained in the safe invariant set of vertex $\mathcal{V}_j$. If this is true, a cost is evaluated 450*c* and associated with an edge between $\mathcal{V}_i$ and $\mathcal{V}_j$ that is added to the graph. This procedure is repeated until all possible pairs of vertices have been considered.

It is understood that the cost associated with the edges of the graph can be evaluated in many ways. In some embodiments, it is taken as a function of the positions of the set-points associated with the two vertices of the edge. This function can for example be a norm of the difference between the set-points. In another embodiment, the cost is computed as the shortest largest distance between the boundary of the robust invariant set of the vertex $\mathcal{V}_i$ and the sale invariant set of the vertex $\mathcal{V}_j$. In yet other embodiments, the cost is taken to be a function expression of the worst-case tracking errors and control effort necessary for the disturbed system to go from the robust invariant set of the vertex $\mathcal{V}_i$ to the next robust invariant set of the vertex $\mathcal{V}_j$. In yet other embodiments, the cost is associated with expected sensing quality in the region of space containing the safe invariant set of the vertex $\mathcal{V}_i$, the vertex $\mathcal{V}_j$, or both. In other embodiments, the cost is set equal in all the edges. Finally, it is understood that the cost can also be expressed using any combination of the above-mentioned methods.

Once the graph has been computed, a graph-search algorithm is used to compute 460*c* the optimal path connecting the starting vertex 401*b* with the terminal vertex 403*b* given the chosen cost. It is understood that many different graph-search methods can be used for this purpose, such as the Dijkstra or A-star algorithms. It is also recognized that the cost to go in the A-star algorithm can be computed in several ways, and that it can be adapted based on the cost used when constructing the edges of the graph. Once the graph-search method has computed a path 460*c*, this path 470*c* is provided as input to the safety mechanism 410*a*.

Figure 4D:
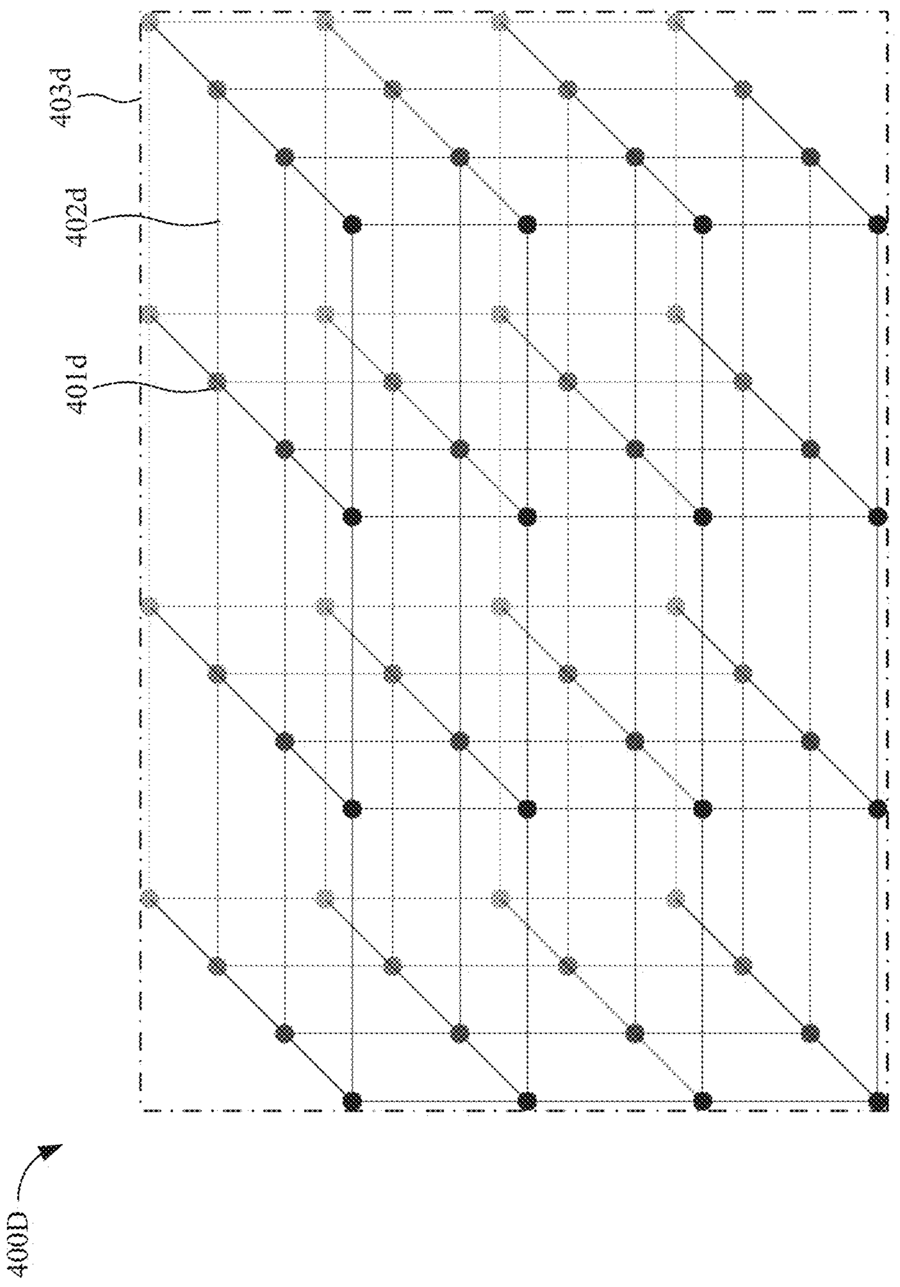
FIG. 4D shows how candidate the set-points are sampled in space using a lattice-based construction, used in one embodiment.

FIG. 4D shows a lattice-based sampling of the candidate set-points in space. A large number of set-points are sampled and associated with the candidate vertices. Candidate set-points 410*d*, 402*d*, are sampled in space 403*d* and the edges between the vertices are determined when construction the graph based on the relationship between the robust invariant sets 230*c* and safe invariant sets 212*d*.

Figure 4E:
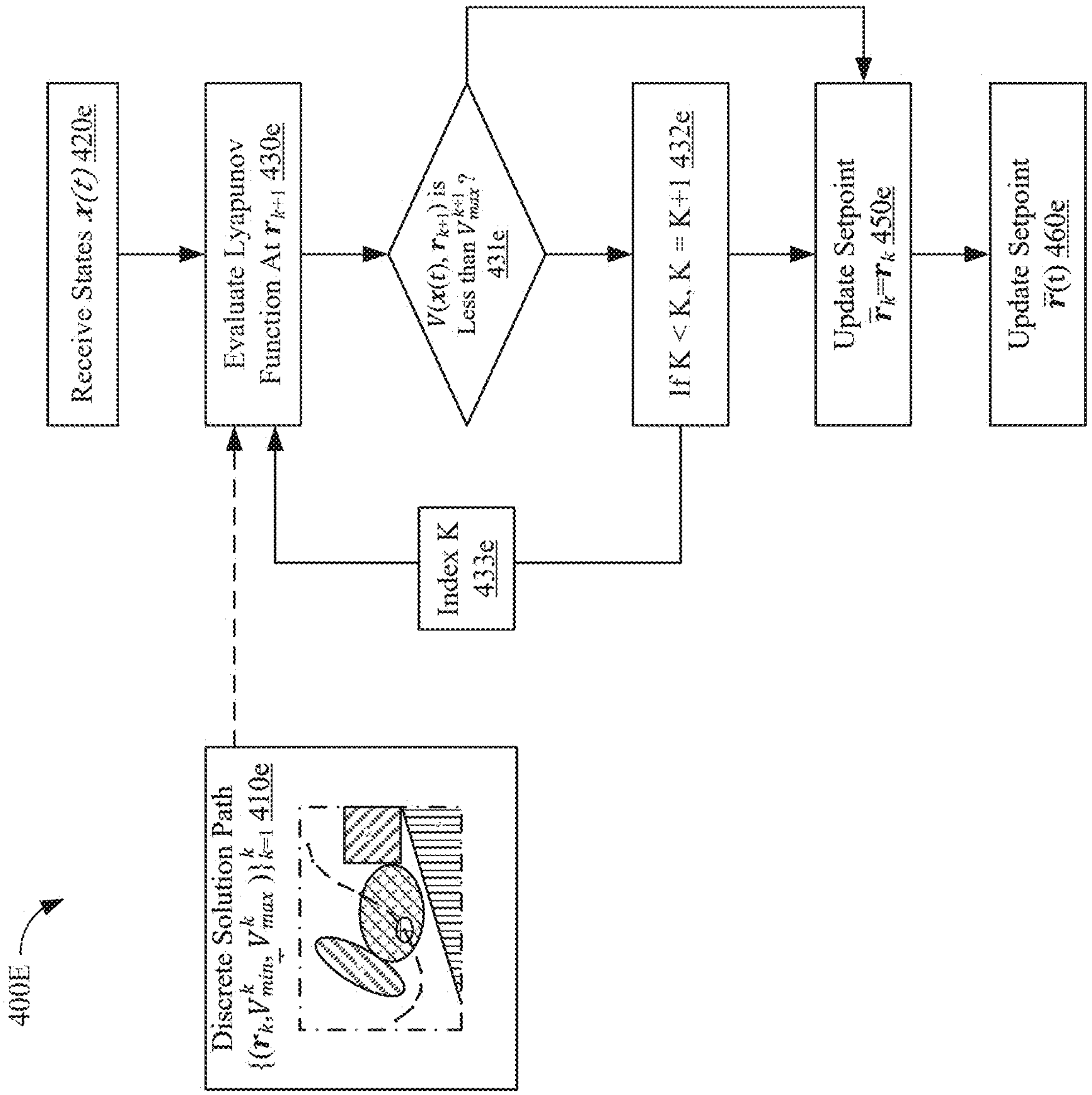
FIG. 4E illustrates how the set-points are updated based on a switching condition used in one embodiment of the present disclosure.

FIG. 4E illustrates an implementation of the safety mechanism when the set-points are updated to produce a piece-wise constant and safe reference trajectory. The states of the controlled system are received 420*e* along with the discrete solution path 410*e* computed as in FIG. 4C. The Lyapunov function associated with the robust and safe invariant sets is evaluated in the current next set-point along the path and compared to the level associated with the safe invariant set at the next set-point in the path 430*e*. If the error is less than the safety limit, the set-point is updated 431*e*, 432*e*. The index of the current vertex in the solution path is returned to the computation of the error margin at the next time step 433*e*. Finally, the updated set-point is updated 450*e* and sent to the controlled system 460*e*.

It is understood that this method of switching ensures that the controlled vehicle always remains in a safe invariant set, thus ensuring safety, and that the controlled system will reach the robust invariant set associated with the terminal vertex in finite time, of there exists a path from the initial to the terminal vertex in the graph.

Figure 4F:
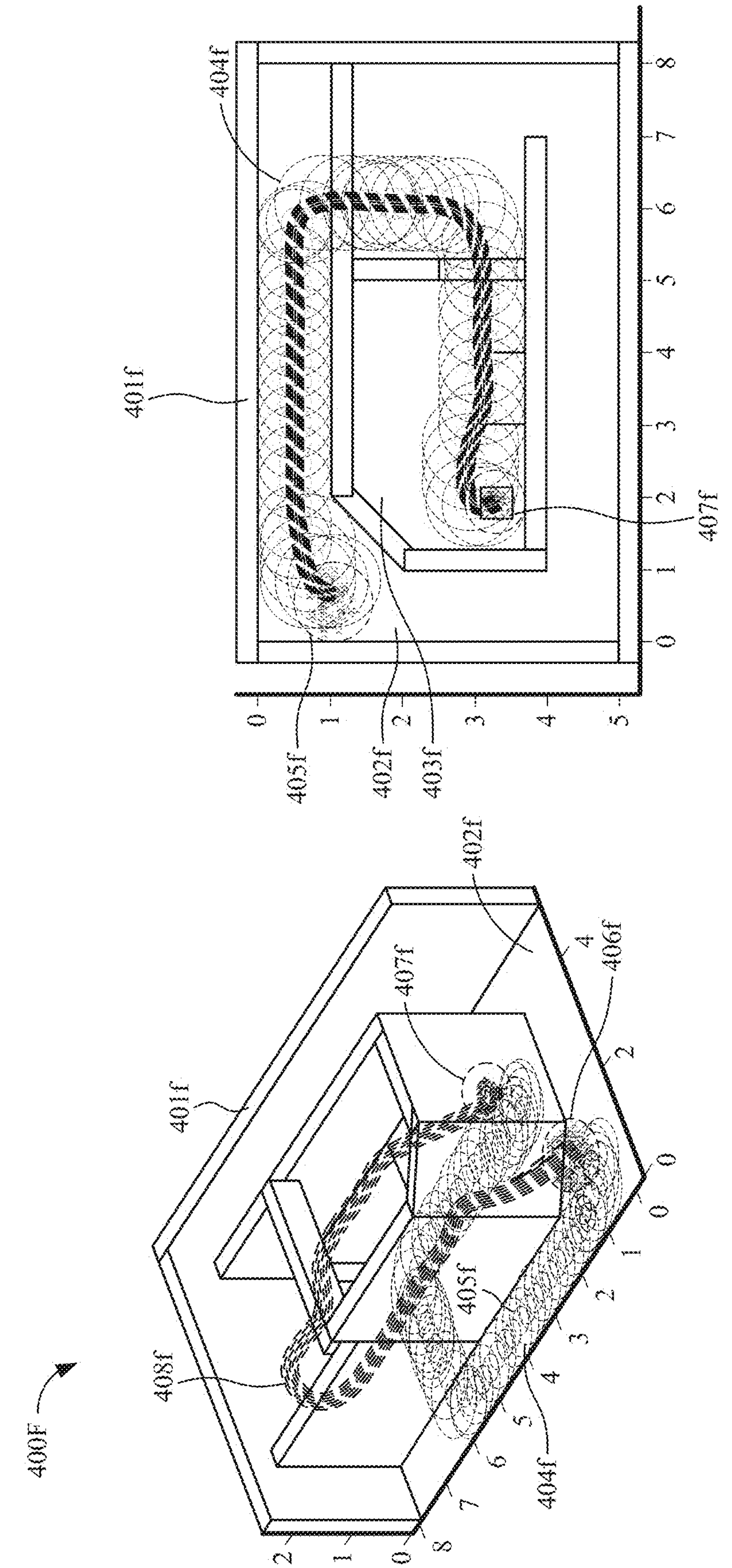
FIG. 4F shows how the safe path is tracked by a vehicle in an indoor environment, which is one exemplar of the invention.

FIG. 4F illustrates one embodiment of the discontinuous safety mechanism, in which an aerial vehicle is initialized with a state in the safe invariant set associated with the initial vertex 406*f* in the outer corridor 402*f* and tasked with navigating to the robust invariant set associated with the terminal vertex 407*f* in the inner room 403*f* while avoiding the obstacles 401*f* shown in gray. The two-dimensional projections of the safe and robust invariant sets are shown in 404*f* and 405*f*, respectively. The resulting motions from several hundreds of different initial conditions and disturbances are shown with the black lines 408*f* which avoid the obstacles and reach the robust invariant set associated with the terminal vertex 407*f*. This is one exemplar of how the discontinuous safety mechanism can be employed for challenging indoor aerial navigation tasks with missions specifying a target location in space.

Figure 4G:
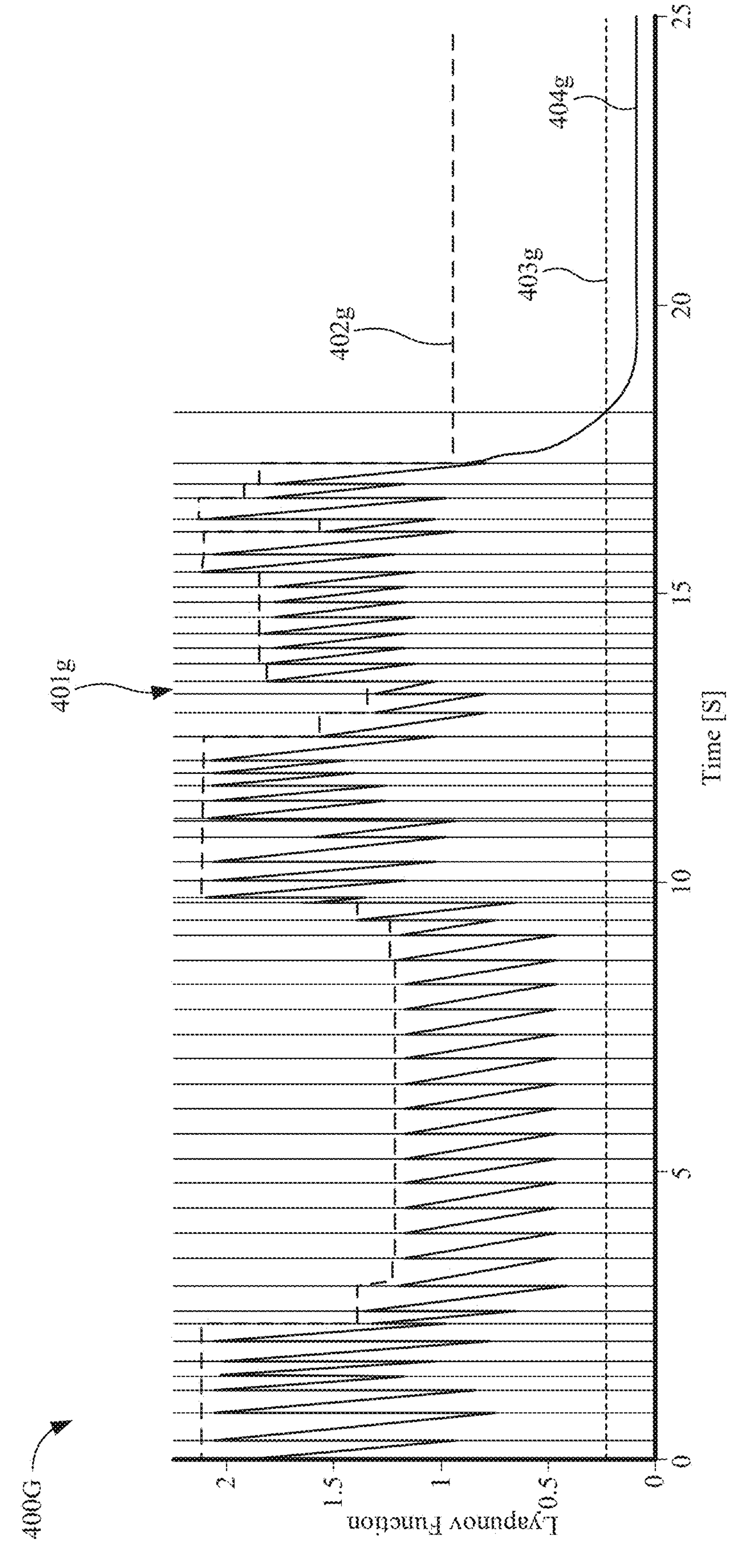
FIG. 4G how the errors of the system remain within their designated sets when switching between different set-points in time, as done in one embodiment.

FIG. 4G illustrates how the Lyapunov function defined with a set-point associated to vertices in the optimal path of vertices remains below the levels characterizing associated safe invariant set 402*g*. The size of the safe invariant sets differs depending on how close the set-point is to the obstacles in the world, and the difference between the safe level and the Lyapunov function is always positive, indicating that the trajectory is safe. Many switches are done 401*g*, one for each vertex in the solution path of vertices, and the controlled vehicle converges to the safe invariant set of the terminal vertex, as indicated by the Lyapunov function 402*g* being below the level associated with the robust positive invariant sets 404*g*.

Implementation Examples

Figure 5A:
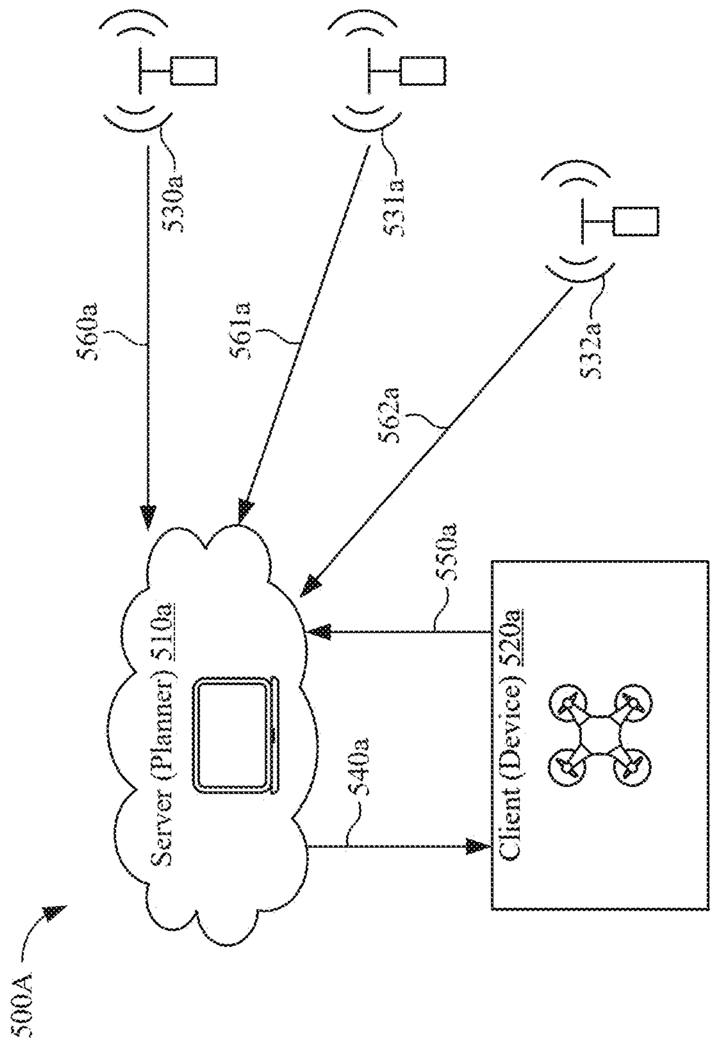
FIG. 5A shows a schematic of the communication and structure for an embodiment in which the vehicles perform remote sensing of the disturbance.

FIG. 5A shows an embodiment where a planner is implemented on a computing server 510*a* in which all computations are done. The server transmits updated set-points 540*a* to the client 520*a*, in this case the vehicle or robot, which tracks the updated set-points and transmits data 550*a* on its own state and in some embodiments also the environment back to the server. In some embodiments, all communication is done once prior to starting the mission, and in other embodiments, the set-points 540*a* are computed and refined continuously as additional information is gathered on the disturbance and the environment. This information may be gathered by the vehicle itself, or by any third-party sensor 531*a*, 532*a*, 533*a*. This sensor may be a physical sensor, such as a LiDAR measuring wind speeds, or a non-physical sensor, such as meteorological forecasts of wind speeds or ocean currents, depending on the vehicle considered.

Figure 5B:
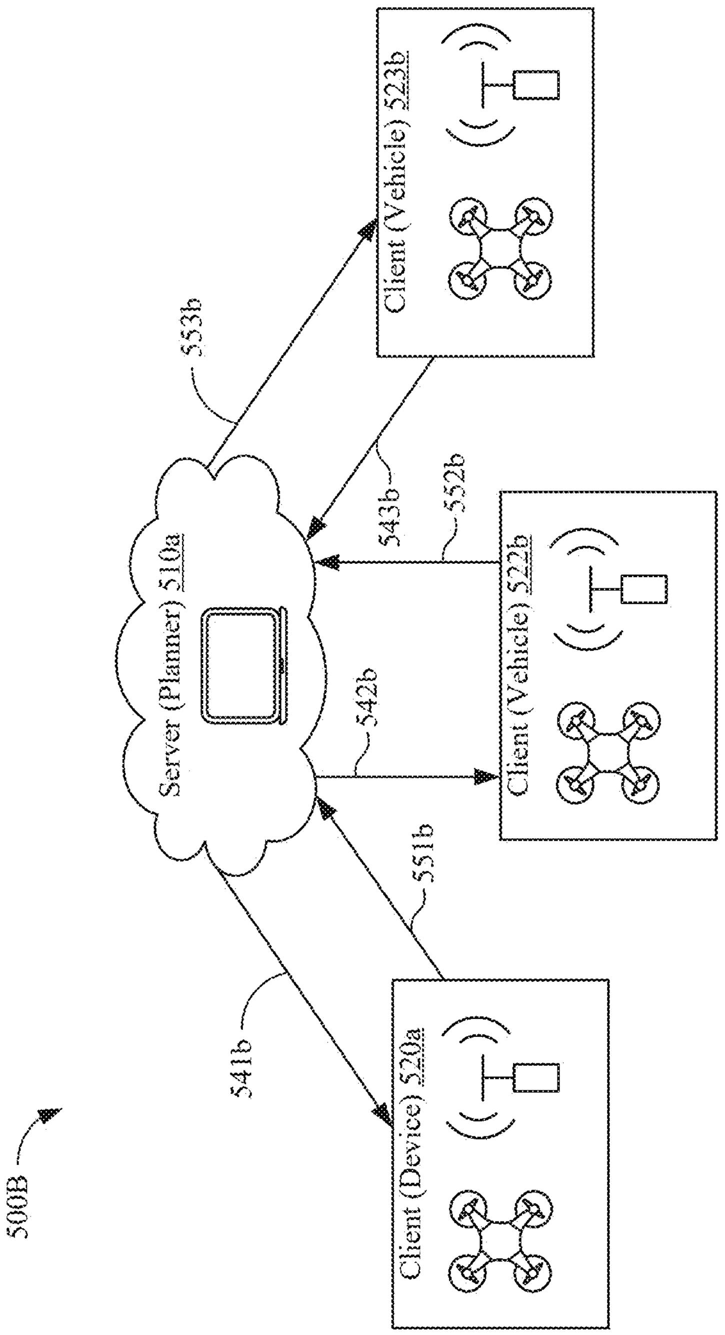
FIG. 5B shows a sketch of how the invention may be modularized as a service for a generic vehicle that can request a motion plan.

FIG. 5B shows yet another embodiment of the planner implemented on a computing server 510*b* in which all planning computations are done. The communication is the same as in FIG. 5A, where 541*b*, 542*b*, 543*b* contain either the unsafe motion plan, the mission information, or the continuously updated modified set-points for each vehicle. In contrast to the previous embodiment, the vehicles 521*b*, 522*b*, 523*b* now contain sensory equipment whereby disturbances and environment information can be measured. As such, the communication to the planner 551*b*, 552*b*, 553*b* now contains additional measurements. In this embodiment, there is no need for any additional external sensing, but some embodiments combine external sensors 531*a*, 532*a*, 533*a* with onboard sensing 521*b*, 522*b*, 523*b*. In other embodiments, the planner is run physically on the vehicle as a component of its larger control system.

Figure 6A:
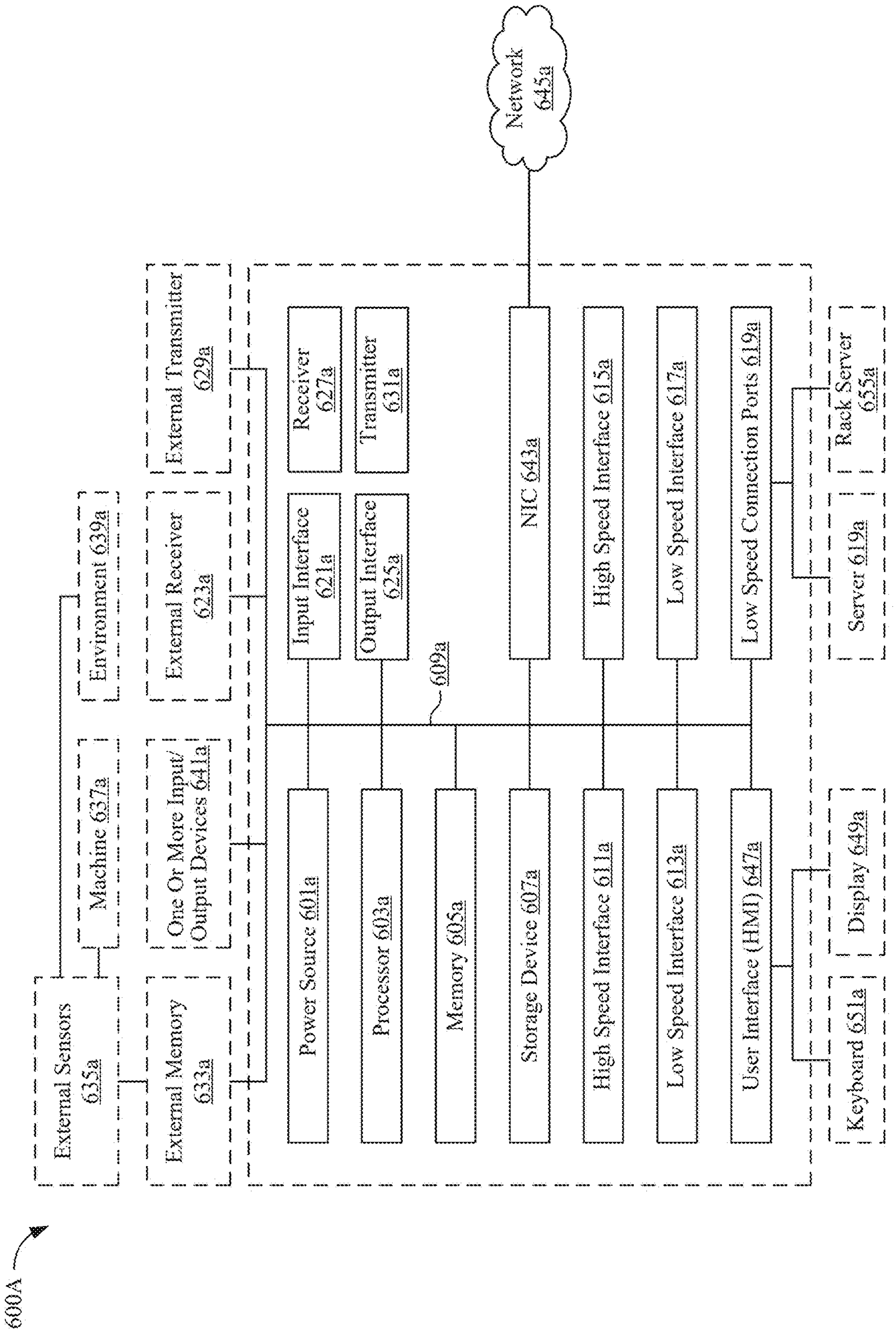
FIG. 6A is a schematic illustrating a computing device for implementing the methods and systems of the present disclosure.

FIG. 6A is a schematic illustrating a computing device 600*a* for implementing the methods and systems/controllers of the present disclosure. The computing device 600*a* includes a power source 601*a*, a processor 603*a*, a memory 605*a*, a storage device 607*a*, all connected to a bus 609*a*. Further, a high-speed interface 611*a*, a low-speed interface 613*a*, high-speed expansion ports 615*a* and low speed connection ports 617*a*, can be connected to the bus 609*a*. In addition, a low-speed expansion port 619*a* is in connection with the bus 609*a*. Further, an input interface 621*a* can be connected via bus 609*a* to an external receiver 623*a* and an output interface 625*a*. A receiver 627*a* can be connected to an external transmitter 629*a* and a transmitter 631*a* via the bus 609*a*. Also connected to the bus 609*a* can be an external memory 633*a*, external sensors 635*a*, machine(s) 637*a*, and an environment 639*a*. Further, one or more external input/output devices 541 can be connected to the bus 609*a*. A network interface controller (NIC) 643*a* can be adapted to connect through the bus 609*a* to a network 645*a*, wherein data or other data, among other things, can be rendered on a third-party display device, third party imaging device, and/or third-party printing device outside of the computing device 600*a*.

The memory 605*a* can store instructions that are executable by the computing device 600*a* and any data that can be utilized by the methods and systems of the present disclosure. The memory 605*a* can include random access memory (RAM), read only memory (ROM), flash memory, or any other suitable memory systems. The memory 605*a* can be a volatile memory unit or units, and/or a non-volatile memory unit or units. The memory 605*a* may also be another form of computer-readable medium, such as a magnetic or optical disk.

The storage device 607*a* can be adapted to store supplementary data and/or software modules used by the computer device 600*a*. The storage device 607*a* can include a hard drive, an optical drive, a thumb-drive, an array of drives, or any combinations thereof. Further, the storage device 607*a* can contain a computer-readable medium, such as a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 603*a*), perform one or more methods, such as those described above.

The computing device 600*a* can be linked through the bus 609*a*, optionally, to a display interface or user Interface (HMI) 647*a* adapted to connect the computing device 600*a* to a display device 649*a* and a keyboard 651*a*, wherein the display device 649*a* can include a computer monitor, camera, television, projector, or mobile device, among others.

The high-speed interface 611*a* manages bandwidth-intensive operations for the computing device 600*a*, while the low-speed interface 613*a* manages lower bandwidth-intensive operations. Such an allocation of functions is only an example. In some implementations, the high-speed interface 611*a* can be coupled to the memory 605*a*, the user interface (HMI) 648*a*, and to the keyboard 651*a* and the display 649*a* (e.g., through a graphics processor or accelerator), and to the high-speed expansion ports 615*a*, which may accept various expansion cards via the bus 609*a*.

In an implementation, the low-speed interface 613*a* is coupled to the storage device 607*a* and the low-speed expansion ports 617*a*, via the bus 609*a*. The low-speed expansion ports 517, which may include various communication ports (e.g., USB, Bluetooth, Ethernet, wireless Ethernet) may be coupled to the one or more input/output devices 641*a*. The computing device 600*a* may be connected to a server 653*a* and a rack server 655*a*. The computing device 600*a* may be implemented in several different forms.

For example, the computing device 600*a* may be implemented as part of the rack server 655*a*.

The description provides exemplary embodiments only and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, using machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further, some embodiments of the present disclosure can be implemented as one or more computer programs, i.e., one or more modules of computer program instructions encoded on a tangible non-transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

Computers suitable for the execution of a computer program include, by way of example, can be based on general or special purpose microprocessors or both, and any other central processing unit. Generally, a central processing unit will receive instructions and data from a read only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., an LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The system's components can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship with each other.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

The invention claimed is:

1. A method for controlling the movement of a vehicle in a constrained environment subject to disturbed vehicle model including uncertainty on the dynamics governing the movement of the vehicle, wherein the method uses a processor coupled with stored instructions implementing the method, wherein the instructions, when executed by the processor, performs the steps of the method, comprising:

collecting a feedback signal indicative of a state of the vehicle and a setpoint for controlling the vehicle according to a task;

determining a robust invariant set centered on the setpoint for the operation of the vehicle in an unconstrained environment using the disturbed vehicle model, wherein the robust invariant set comprises an ellipsoidal volume determined by an solving optimization problem that includes bounds on the maximum rotation angle of the attitude tracking error in the closed-loop vehicle control system, bounded input disturbances of the disturbed vehicle model, and the polytopic uncertainties in the gains of the disturbed vehicle model;

inflating the robust invariant set equally in all directions until a termination condition defined by the constraint environment is met to produce a safe invariant set; and controlling the operation of the vehicle according to the task while maintaining the state of the vehicle within the safe invariant set.

2. The method of claim 1, wherein the robust invariant set is the smallest set of a predetermined shape characterized by a Lyapunov function and a level of the Lyapunov function for the vehicle corresponding to the disturbed vehicle model.

3. The method of claim 2, wherein the robust invariant set is inflated by one or a combination of changing a level of the Lyapunov function and scaling parameters of the Lyapunov function.

4. The method of claim 2, wherein the predetermined shape of the robust invariant set is ellipsoidal or polyhedral.

5. The method of claim 1, wherein the operation of the vehicle is done by closed-loop feedback control, wherein the robust invariant set is determined to have an ellipsoidal volume with geometry computed in the parameters of the disturbed vehicle model.

6. The method of claim 5, wherein the vehicle is controlled by a controller with unknown gains, and wherein the robust invariant set is determined for a set of possible controllers that describe how the dynamical system moves toward the setpoint, wherein the set of possible controllers describe the gains of the disturbed vehicle model and are defined with polytopic uncertainty.

7. The method of claim 1, wherein the control is performed using a model predictive controller over a prediction horizon, such that the safe invariant set is determined for each time step, along each point of the prediction horizon, or both.

8. The method of claim 1, further comprising:

collecting a trajectory defining the operation of the dynamical system to perform the task, wherein the trajectory is differentiable and is not guaranteed to be safe or feasible;

determining a differential equation having a solution defining a setpoint trajectory, using the safe invariant set, unsafe trajectory, and the state of the vehicle;

integrate the differential equation for each time step of the control to produce the setpoint trajectory; and controlling the vehicle according to the computed setpoint trajectory.

9. The method of claim 8, wherein the trajectory is determined using an optimization method that minimizes a cost function including a total variation of the movement of the vehicle and its derivatives subject to constraints defined by the constrained environment.

10. The method of claim 8, wherein the trajectory is determined using a navigation field computed in simplified world geometry having obstacles of the constraint environment represented as spheres, wherein the simplified world geometry is mapped to the obstacles in the constrained environment using one or more diffeomorphisms.

11. The method of claim 10, wherein the diffeomorphisms are partitioned into a first diffeomorphism that scales the world geometry, and a second diffeomorphism that maps the scaled geometry to the simplified world geometry using obstacle and boundary influence functions computed as solutions to an optimization problem.

12. The method of claim 1, further comprising:

computing a set of setpoints and a set of safe invariant sets centered on the corresponding set points; and constructing a graph having vertices defined by the set of setpoints; and determining connectivity of the graph based on the safe invariant sets, such that a connection is established if the robust invariant set of one node is contained in the safe invariant set of another;

finding a solution path of vertices connecting an initial vertex in the graph to a terminal vertex in the graph corresponding to the specified task; and controlling the vehicle according to the solution on the graph by switching the setpoints based on the Lyapunov function and its size in relation to the safe invariant sets of the nodes along the vertices in the solution path.

13. The method of claim 12, wherein the solution path on the graph is a time-agnostic sequence of setpoints, wherein the controlling uses a switching logic connecting the time-agnostic sequence of setpoints in time based on the errors induced by the disturbances acting on the vehicle.

14. The method of claim 13, wherein the switching logic is defined by checking if the Lyapunov function associated with the robust invariant set of the next node in the solution path is smaller than the safe invariant set of the same node in the path.

15. The method of claim 14, wherein the motion trajectory is computed in simulation and used to control the vehicle along a set-point trajectory defined in time.

16. The method of claim 1, wherein the vehicle is a drone operating in an indoor environment and the robust invariant set is computed in six-dimensional space comprising the positions and velocities of the drone.

17. The method of claim 1, wherein the dynamical system (or a vehicle) is a drone, wherein the constraint environment includes an indoor environment having obstacles defining the constraints.

18. A feedback controller for controlling a movement of a vehicle in a constrained environment subject to disturbed vehicle model including uncertainty on the movement of the vehicle, comprising: at least one processor; and a memory having instructions stored thereon that, when executed by the at least one processor, cause the feedback controller to:

collect a feedback signal indicative of a state of the vehicle and a setpoint for controlling the vehicle according to a task;

determine a robust invariant set centered on the setpoint for the operation of the vehicle in an unconstrained environment using the disturbed vehicle model, wherein the robust invariant set comprises an ellipsoidal volume determined by an solving optimization problem that includes bounds on the maximum rotation angle of the attitude tracking error in the closed-loop vehicle control system, bounded input disturbances of the disturbed vehicle model, and the polytopic uncertainties in the gains of the disturbed vehicle model;

inflate the robust invariant set equally in all directions until a termination condition defined by the constraint environment is met to produce a safe invariant set; and control the operation of the vehicle according to the task while maintaining the state of the vehicle within the safe invariant set.

19. A non-transitory computer readable storage medium embodied thereon a program executable by a processor for performing a method, the method comprising:

collecting a feedback signal indicative of a state of the vehicle and a setpoint for controlling the vehicle according to a task;

determining a robust invariant set centered on the setpoint for the operation of the vehicle in an unconstrained environment using the disturbed vehicle model, wherein the robust invariant set comprises an ellipsoidal volume determined by an solving optimization problem that includes bounds on the maximum rotation angle of the attitude tracking error in the closed-loop vehicle control system, bounded input disturbances of the disturbed vehicle model, and the polytopic uncertainties in the gains of the disturbed vehicle model;

inflating the robust invariant set equally in all directions until a termination condition defined by the constraint environment is met to produce a safe invariant set; and controlling the operation of the vehicle according to the task while maintaining the state of the vehicle within the safe invariant set.

* * * * *